United States Patent [19]

de Kermadec et al.

[11] 4,400,709

[45] Aug. 23, 1983

[54] IMAGE PRINTER STYLUS BAR, MANUFACTURING METHOD THEREFOR AND IMAGE PRINTER DEVICE

[75] Inventors: Alain de Kermadec, Rochefort en Yvelines; Christian Delanoé, Versailles, both of France

[73] Assignee: Compagnie Industrielle des Telecommunications Cit-Alcatel, Paris, France

[21] Appl. No.: 168,910

[22] Filed: Jul. 14, 1980

[30] Foreign Application Priority Data

Jul. 13, 1979 [FR] France .................................. 79 18269
Jul. 13, 1979 [FR] France .................................. 79 18270
Jun. 27, 1980 [FR] France .................................. 80 14398

[51] Int. Cl.³ ............................................ G01D 15/06
[52] U.S. Cl. ..................................... 346/154; 346/155; 346/165
[58] Field of Search ............... 346/139 R, 139 C, 154, 346/155, 165; 178/30; 358/300

[56] References Cited

U.S. PATENT DOCUMENTS 3,624,661 11/1971 Shebanow et al. .................. 346/155
3,813,492  5/1974 Potter ..................................... 178/30
3,979,757  9/1976 Kilby et al. .......................... 346/155

FOREIGN PATENT DOCUMENTS 2350273 4/1975 Fed. Rep. of Germany .
2551957 5/1976 Fed. Rep. of Germany .
2602194 7/1976 Fed. Rep. of Germany .
2751381 7/1978 Fed. Rep. of Germany .
2828356 1/1979 Fed. Rep. of Germany .
2110322 6/1972 France .
2155840 5/1973 France .

*Primary Examiner*—Thomas H. Tarcza
*Attorney, Agent, or Firm*—Sughrue, Mion, Zinn, Macpeak and Seas

[57] ABSTRACT

Image printing stylus bar, manufacturing method therefor and image printing device.

The present invention relates to an image printing stylus bar with as many styli as there are image points on a scanned line on a document to be reproduced, a manufacturing method therefor and a printing device constituting an application thereof.

The stylus comprises 2.m register stage chips (59, 60) each having a serial data input, n parallel outputs, a serial data output and control inputs, disposed on at least one film (57, 58) and connected in series in groups of m to constitute two shift registers, the parallel output of each of the m consecutive chips being connected to respective styli (51, 52) for marking image points with the same parity on each line.

21 Claims, 18 Drawing Figures

IMAGE PRINTER STYLUS BAR, MANUFACTURING METHOD THEREFOR AND IMAGE PRINTER DEVICE

The present invention concerns a stylus bar for printing images on sensitised paper. The stylus bar is usable, inter alia, in a facsimile receiver for printing out facsimile documents.

In a facsimile transmission system, a document is analysed and its content transmitted to the receiver, where it is reproduced by a printing head or stylus bar which scans successive lines on sensitised paper. The head or stylus bar is fed with the data signal sent to the receiver and defining the content of a scanned line on the analysed document, to print consecutive image points along a scanned line on the sensitised paper. The image points are formed on the paper by triggering a reaction which locally modifies the appearance of the paper, by changing its colour for example. A known type of electrocatalytic paper contains a material acting as a catalyst in the reduction of silver ions. An image point is printed by the local application to the paper of a stylus containing silver, and electrical current passing between the stylus and the paper to reduce the silver ions which form, accompanied by a local modification to the colour of the paper.

A complete image line may be printed by means of a stylus bar comprising as many styli as there are image points on the line. Successive image lines are printed by stepwise relative displacement of the paper and stylus bar. Such a stylus bar might comprise a stack of mutually insulated conductive plates, one end of each plate constituting one stylus. Alternatively, the stylus bar might comprise an array of conductive strips carried by an insulative plate and insulated from one another, one end of each tape being connected to, carrying or constituting one stylus. The stylus bar may also incorporate means for controlling or addressing the various styli.

Thus in U.S. Pat. No. 4,323,927 in the name of the present applicant, published on June 13, 1977, the stylus bar is formed by a stack of conductive plates insulated from one another and separated from one another by a distance equal to the pitch of image points along a print line. The stylus bar in this disclosure further comprises n diagonal diode matrices for addressing the styli, respective columns of which are constituted by said plates, respectively fed through resistances each formed by depositing a resistive material on one side of each plate, the rows common to the n matrices and individually fed comprising electrical conductors connected to the plates through diodes each formed by a chip of semiconductor material on one of the plates.

Similarly, in U.S. Pat. No. 4,180,824, also in the name of the present applicants a stylus bar comprises an array of conductive tapes and n diagonal diode matrices for addressing the styli, respective columns of these matrices being constituted by the conductive tapes of said array and fed through electrical resistances in electrical contact with respective tapes, the rows common to the n matrices and fed individually being constituted by conductive tapes of a second array connected to the conductive tapes (columns) of the aforementioned array through diodes mounted on the conductive tapes constituting the rows or columns of the matrices.

In these styli addressing and control systems, the diodes are used to selectively short-circuit the styli in the same matrix, independently of one another. The diodes are also used to select a single one of the n matrices. Thus the styli are addressed and fed individually, one after the other.

The present invention is intended to provide a multi-stylus stylus bar such that the individual styli are simultaneously but individually activated so that as large a proportion as possible of the time available for printing the document is available for the printing of each image point, thereby improving the document output rate. The invention is also intended to provide a stylus bar structure which facilitates the assembly of the various component parts, the electrical interconnection of these component parts being automatically obtained by the assembly thereof. The invention is further intended to facilitate dismantling the stylus bar assembly.

The present invention consists in a stylus bar for two-state printing on electrosensitive paper scanned in successive lines by said bar which comprises as many mutually insulated styli forming a stylus area on said bar as there are image points in each scanning line and a shift register type memory receiving data defining said image points with parallel outputs individually controlling said styli and thereby the marking of said image points on said paper, the stylus bar being characterised in that said memory comprises 2.m register stage chips each with a serial data input, n parallel outputs, a serial data output and control inputs comprising a clock input controlling the shifting of data from one register stage to the next and two feed inputs defining two voltage levels corresponding to the levels of said data, m and n being integers such that the product 2.m.n is at least equal to the number of styli, said chips being supported on at least one film and connected in series in two groups of m chips to constitute two separate shift registers each with inputs of the same type as those of the chips and with m.n parallel outputs, at least some of which (consecutive and hereafter referred to as the "useful" parallel outputs of the m chips of the register in question) being connected to respective styli of like rank in said stylus area, in other words so that respective registers are connected to odd ranked styli and to even ranked styli in the stylus area, so as to simultaneously feed said styli with one of said voltage levels, according to the binary data level present on respective useful parallel outputs of said chips, representing individual control signals for the styli to which they are connected.

According to another feature of the invention, the stylus bar comprises two films each carrying m register stage chips connected in series, respective useful parallel outputs thereof being brought out to and regularly spaced along a longitudinal edge of the film, and an insulative support carrying two arrays of conductive tracks, the first ends of which carry respective styli and extend, regularly spaced within each array, into a longitudinal area of the support constituting said stylus area, second ends of the tracks of the two arrays, also regularly spaced in each array, extending into two other longitudinal areas of the support, one on each side of said stylus area, each array being connected by respective elastomer connecting strips with conductive areas to respective useful parallel outputs of the chips of the respective film, on each of which the useful parallel outputs of the chips are regularly spaced at the same pitch as the second ends of the tracks of the respective array.

The invention further relates to the method of manufacturing the stylus bar. In another aspect, the invention consists in a method of manufacturing a stylus bar characterised in that it comprises the steps of forming on said support two arrays of conductive tracks extending, in each array, from a first longitudinal area on the support in which they are regularly spaced in each array and constitute said first track ends, to respective second longitudinal areas on the support on opposite sides of said first area, in which they are regularly spaced in each array and constitute said second track ends; electrolytically depositing on each of said first track ends a conductive material resistant to abrasion to form the styli; mounting said register stage chips on each film in predefined locations using the Inner Lead Bonding (ILB) pase of the Tape Automated Bonding (TAB) process; bringing the useful parallel outputs of the chips out to one edge at a regular pitch equal to that of the second track ends of one array, and connecting the m chips on each film in series; and mounting and maintained the two connecting strips between the support and the respective film, aligned with the second track ends and the useful parallel outputs of the chips, to form the respective connections therebetween.

The styli are preferably arranged in two rows in said stylus area, separated by a distance equal to the height of a scanning line, the styli of one row, at the first ends of the tracks of one array, being aligned with the gaps between styli of the other row, at the first ends of the tracks of the other array.

In a further aspect, the invention consists in a device for printing a two-state image on electrosensitive paper scanned in successive lines by said device, according to binary data D relative to each successive scanning line and received by the device at a rate defined by a clock signal HR, a short "line change" pulse being applied to the device on each change of scanning line to which said data D relates, said device incorporating a stylus bar according to claim 6 and being characterised in that it comprises, associated with the stylus bar, in which each of the register stage chips and thus each of the shift registers formed thereby comprises a control input disabling its parallel outputs, control logic comprising two first buffer memories, the capacity of each being equal to the number of points per scanning line, alternately loaded with the data D received by the device under the control of clock signal HR and unloaded to a first output of the control logic, under the control of a clock signal HL and at a rate set by said "line change" pulses, means for generating said clock signal HL comprising a clock generating signal $H_0$ associated with a counter receiving on its input said signal HL and disabling signal $H_0$ when the counter state is equal to the number of points per line, said counter being reset to 0 by each line change pulse to enable said signal $H_0$ which then constitutes said signal HL, the device further comprising two second buffer memories, the capacity of each being equal to the number of points per scanning line, alternately loaded with the data output to said first output of the control logic under the control of a signal H at one half the rate of signal HL and unloaded to a second output of the control logic under the control of said signal H, at the given rate, every two line change pulses, said first and second outputs of said control logic being connected to the serial input of respective shift registers of the stylus bar to load said register under the control of said signal H applied to the shift control input of the register, said counter providing a disabling signal applied to the parallel output disabling input of each register of the stylus bar to disable said parallel outputs when the counter state is not equal to the number of points per scanning line.

Other objects and advantages will appear from the following description of examples of the invention, when considered in connection with the accompanying drawings, in which.

Figure 1:
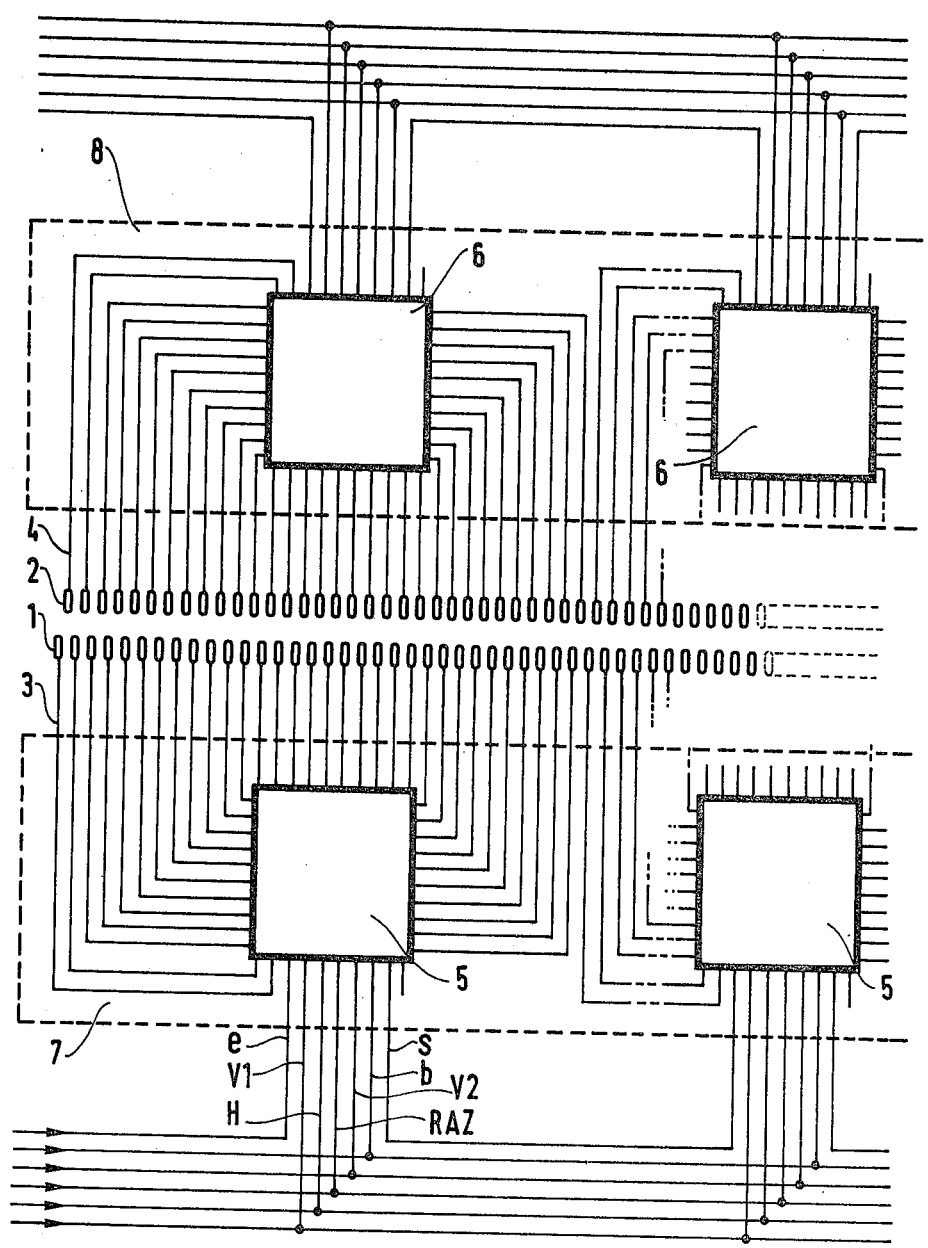
FIG. 1 is a block schematic of a stylus bar in accordance with the invention, showing a specific layout of the styli.

Referring to FIG. 1, which is a block schematic showing a stylus bar according to the invention, the stylus bar comprises styli 1, 2, etc, the total number of styli being equal to the number of image points in one scanning line on a document to be reproduced on electrosensitive paper scanned line by line by the stylus bar. In the embodiment shown in FIG. 1, the styli are arranged in two rows separated by the pitch of the scanning lines on the electrosensitive paper, in other words by one scanning line. This defines a line between the rows of styli isolating those in one row from those in the other row. In each row, the styli are regularly spaced at twice the pitch of image points along a scanning line. The styli in one row are opposite the gaps between styli in the other row.

Conductive tracks 3, 4, etc, connected to the respective styli, extend to either side of the two rows of styli, defining individual feed arrays for the styli.

The stylus bar incorporates 2.m register stage chips 5, 6 etc. Each chip has a serial data input e, n parallel outputs (referred to herein as register outputs or parallel outputs) and an inhibit input b. Two sets of m chips are connected in series to define two shift registers 7 and 8, each with m.n parallel outputs, associated with respective conductive track arrays. The values of m and n are such that the product is at least equal to the number of styli.

At least some consecutive parallel outputs of each of shift registers 7 and 8, constituting the "useful" register outputs of the m chips forming the register in question, are connected to respective tracks in the array associated with the register in question to feed all said tracks simultaneously. Two consecutive tracks of the array are connected to two consecutive parallel outputs of the register in question, whatever the two tracks. If the product 2.m.n is equal to the number of styli, all register outputs of all chips of the same shift register are "useful" outputs, connected to respective tracks of the array associated with that register. By way of example, for a 216 mm long scanning line of 1728 image points, each chip has n=32 register outputs (as shown in the drawing), each of the two shift registers being formed by 27 chips. Note that if the product m.n is greater than the number of styli connected to the tracks of the array associated with one shift register, this number lying between (m−1).n and m.n, the consecutive parallel outputs of the shift register connected to the tracks of the associated array comprise all register outputs of the first m−1 chips and some register outputs of the last chip constituting the register in question, the remaining register outputs of the last chip being unused.

Each register stage chip also has a clock input H, two feed inputs $V_1$ and $V_2$ carrying the two voltages corresponding to the two print logic levels, a data output s and a control input for forcing a given state at the register outputs corresponding to the print logic level which does not change the colour of the electrosensitive paper. Hereinafter, this state is referred to as the zero state and this input as the reset input RAZ. The register outputs of each chip are complemented and output s is connected to input e of the next chip, being constituted by the final and non-complemented register output. From one chip in a given shift register to the next, like control inputs, excluding data inputs e, are connected in parallel by additional links or tracks to constitute the corresponding inputs of the shift register in question.

The consecutive register outputs of each chip are arranged around the chip perimeter between input e adjacent the first register output (in other words, the output connected to the first stage of the chip) and output s adjacent the final register output. The other chip inputs are arranged along the chip perimeter between input e and output s.

The serial input of the first register stage chip in each shift register constitutes the serial input to the register as a whole. This input receives data defining the colour (black or white) of the image points corresponding to the styli of the row associated with the register in question. This data is loaded at constant rate H, and during each loading operation the register outputs are held in the print logic level which does not change the colour of the electrosensitive paper (print logic level "1" in this example). During this operation the data passes serially through the successive stages of each shift register. When each shift register is loaded, the image points corresponding to the data held in the two registers are formed by enabling the register outputs to feed the individual styli.

Depending on the logic level of the binary data corresponding to the image points associated with the respective styli, the electrosensitive paper will be marked or not at the points of contact with the styli.

In view of the arrangement of the styli, this write operation will form the even (or odd) image points of the line scanned by one row of styli and the odd (or even) image points of another line scanned simultaneously by the other row of styli. The two lines scanned simultaneously by the two rows of styli of the stylus bar are separated by an intermediate scanning line. All image points on a given scanning line are formed by scanning the line twice, once with each row of styli (in other words, after two line feed of the paper relative to the stylus bar).

Figure 2:
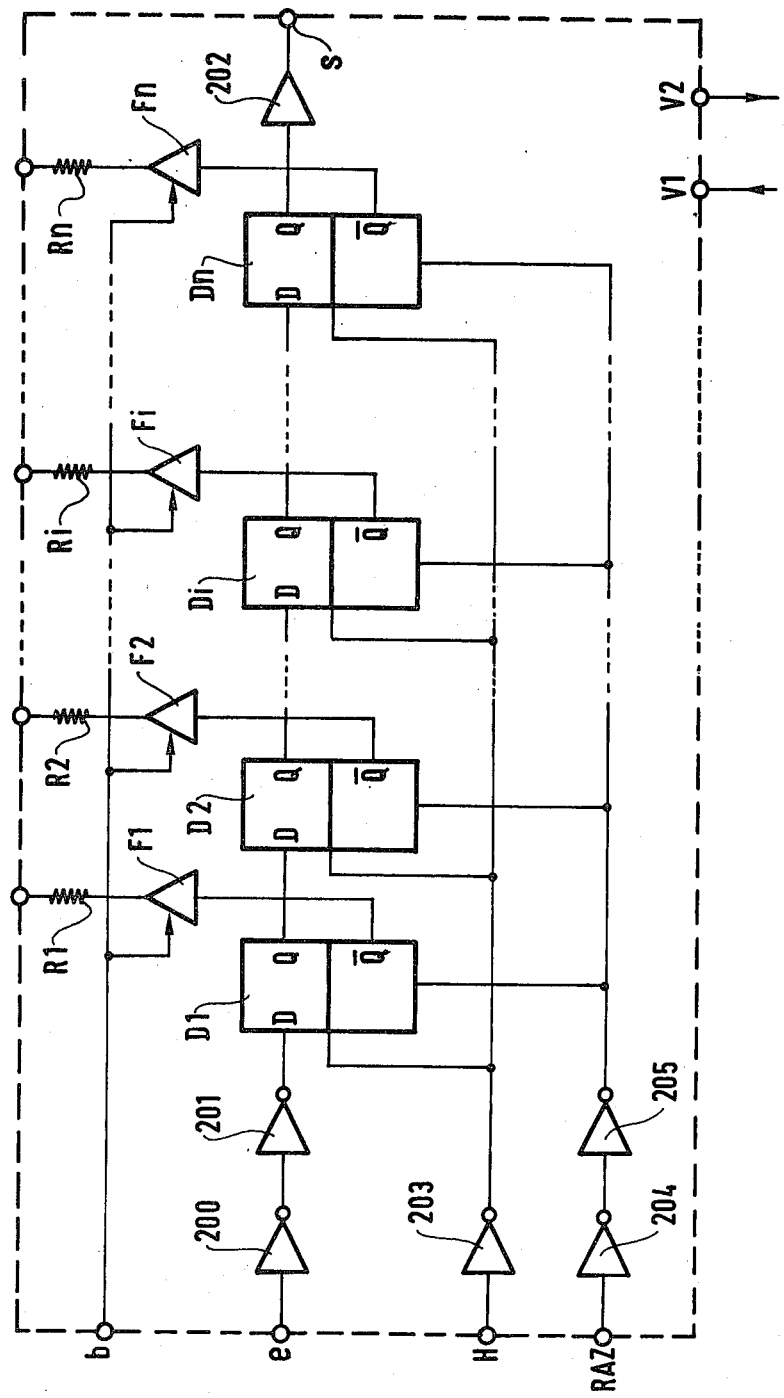
FIG. 2 is a block schematic showing the logic circuitry of one of the electrical components of the stylus bar.

FIG. 2 is a block schematic showing the logic circuitry of a register stage chip 5, 6, etc shown in FIG. 1.

Referring to FIG. 2, the n stages of the chip comprise n D type flip-flops D1 to Dn, connected in series. The Q output of each flip-flop Di ($1 \leq i \leq n$) is connected to the D input of flip-flop D(i+1). The D input of flip-flop D1 is connected to input e of the chip through two inverting driver gates 200 and 201 connected in series. The Q output of flip-flop Dn is connected to the chip output s through a non-inverting driver gate 202.

Clock input H of the chip is connected to the respective clock inputs of flip-flops D1 to Dn through an inverting driver gate 203. The reset input RAZ of the chip is connected to the respective reset inputs of the flip-flops through series-connected inverting driver gates 204 and 205.

The $\overline{Q}$ outputs of flip-flops D1 to Dn are connected to respective register outputs of the chip through non-inverting driver gates F1 to Fn, respectively. These tri-state gates each have an inhibit input connected to the inhibit input b of the chip. Current surge protection resistors R1 to Rn are connected in series with the outputs of gates F1 to Fn, respectively.

It will be understood that the supply inputs of the various flip-flops and gates shown in the diagram are connected to the supply inputs $V_1$ and $V_2$ of the chip. As is common practice when drawing logic diagrams, these connections have been omitted for the sake of simplicity.

Flip-flops D1 to Dn are held in the zero state by a logic "1" on the RAZ input. The outputs of gates F1 to Fn are held at logic "1" by a logic "1" on input b.

The logic circuit shown in FIG. 2 is that of a serial input parallel output shift register similar to certain shift register designs commercially available in integrated circuit form, associated with means for disabling its parallel outputs against overcurrents and having also a serial data output. The operation of the circuit will be obvious to those skilled in this art and will therefore not be described here.

The register stage chips (5, 6, etc, FIG. 1) preferably use CMOS technology, and are manufactured using any of the conventional semiconductor diffusion processes, such as the "Metal Gate" process, for example.

FIGS. 3 to 18 show various embodiments of a stylus bar in accordance with the invention and the methods used to manufacture them. Note that the figures are not drawn to scale, in order to show the relevant structural details more clearly.

In the present example, a scanning line on the electrosensitive paper comprises 1728 image points regularly spaced over a length of 216 millimeters, with eight image points per millimeter and a pitch or separation between consecutive image points of 125 $\mu$m. The line feed pitch relative to the stylus bar, in other words the distance between consecutive scanning lines, is 260 $\mu$m.

Each stylus bar therefore comprises 1728 styli to print the 1728 image points per scanning line, each image point being 125 $\mu$m × 260 $\mu$m.

Figure 3:
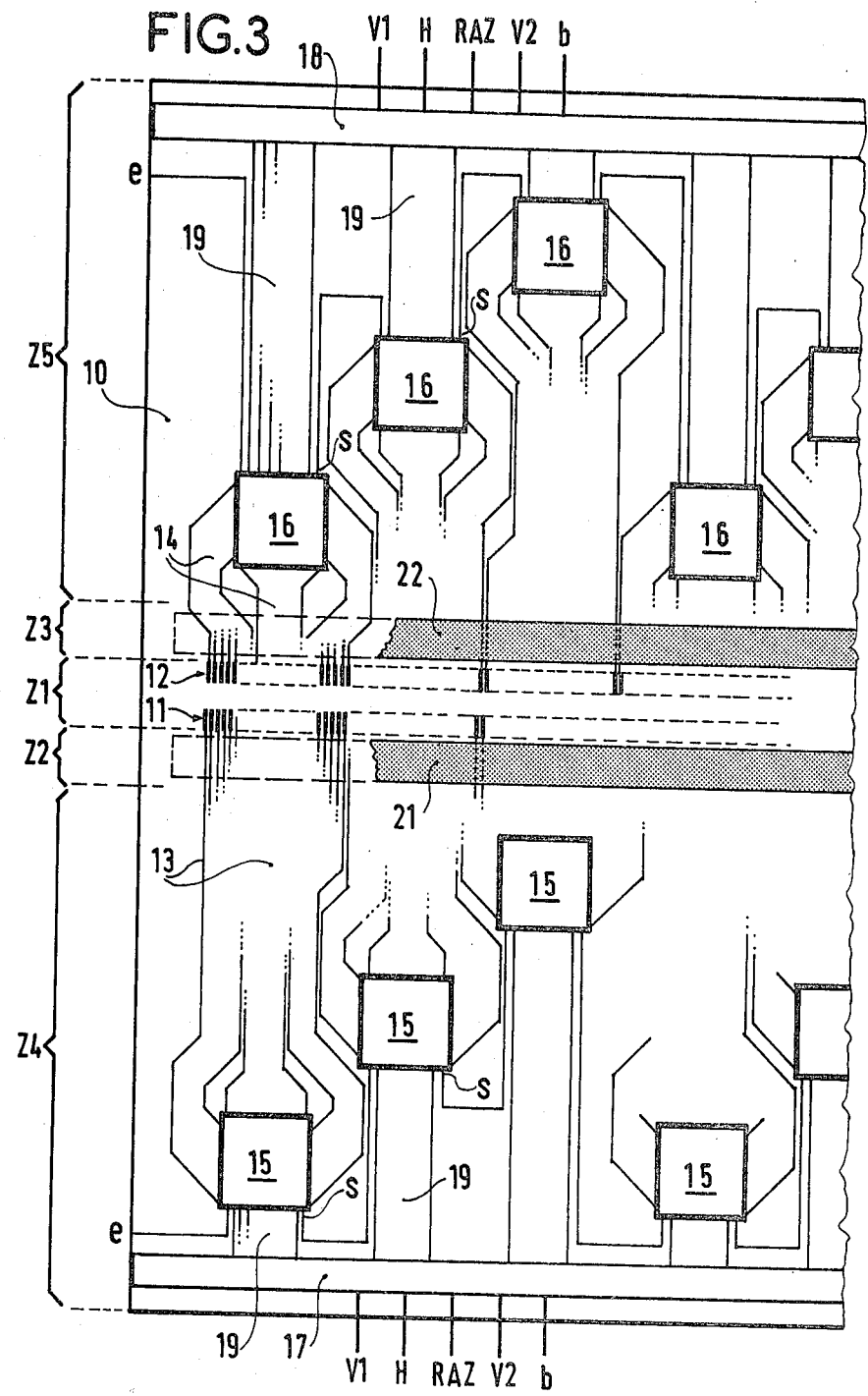
FIG. 3 shows a first embodiment of the stylus bar.

FIG. 3 shows schematically a first "unitary construction" embodiment of the stylus bar. It comprises an insulative support 10, of epoxy resin, for example, one side of which carries the components defining the electrical circuit shown in FIG. 1. This side of the support is divided into various areas: the longitudinal median area $Z_1$ carrying the styli, areas $Z_2$ and $Z_3$ on either side of the stylus area and adjacent thereto, referred to as the connection areas, and areas $Z_4$ and $Z_5$ beyond the connection areas, referred to as command areas.

Support 10 carries two arrays of conductive tracks 13 and 14 constituted, for example, by copper tracks deposited on the associated side of the support. The conductive tracks of the two arrays are in connection areas $Z_2$ and $Z_3$, respectively, extending into the adjacent part of the styli area $Z_1$ and into the adjacent command area $Z_4$ or $Z_5$, respectively.

In styli area $Z_1$, the ends of the tracks define the stylus locations and have approximately the required dimension of the styli: 125 $\mu m \times 260$ $\mu m$. In each array they are spaced at 250 $\mu m$ intervals, those of the two arrays being offset one half-interval of 125 $\mu m$, the two arrays being separated by 260 $\mu m$.

The end part of each track is covered with an electrically conductive material which is resistant to mechanical abrasion, using an electrolytic deposition method. This forms the styli 11, 12, etc, which are separated from one another to provide electrical insulation. Two strips of insulating material 21 and 22 arranged one on each side of the stylus area and overlying the conductive tracks insulate those tracks from the electrosensitive paper as the paper is scanned by the stylus bar. In each of command areas $Z_4$ and $Z_5$ the corresponding array tracks terminate at the locations for the register stage chips shown in FIG. 1, m in number in each command area. In each command area $Z_4$ and $Z_5$, these end portions of the array tracks are associated with further conductive tracks 19, etc forming m arrays for the respective m register stage chips. In each array, the tracks are arranged as appropriate to the input and output connections to the corresponding register stage chip. The ends of the tracks of each array are connected to respective register outputs of a register stage chip 15, 16, etc. These chips are mounted on and attached to the support 10 at the appropriate position by an automatic process, preferably the Tape Automated Bonding (TAB) process. The additional tracks 19, etc are connected to the chip inputs and chip output s.

In command areas $Z_4$ and $Z_5$, adjacent its longitudinal edges, support 10 carries two multilayer conductive strips 17 and 18. The layers in each strip are electrically insulated from one another and respective layers connect in parallel the inhibit inputs b, the feed inputs $V_1$ and $V_2$, the reset inputs RAZ and the clock inputs H of all chips in the command area in question. In each command area additional tracks 19, etc provide the series connections between the various chips and the connection of inputs b, $V_1$, $V_2$, RAZ and H to the corresponding conductive strip 17 or 18 carrying the corresponding and identically referenced inputs of the shift register thus formed and the connection of input e of the first chip to the identically referenced serial data input of that shift register.

FIG. 3 also shows that the consecutive register chips in the same command area are in different longitudinal rows, three in number in this example. This is to make optimum use of the available space, to which end the end parts of the tracks are brought close together in each command area.

To obtain a unitary construction stylus bar such as that shown in FIG. 3, the copper tracks are first obtained by etching a layer of cold-rolled copper bonded to the support. In view of the pitch between tracks in the present application, the method used is the conventional method for manufacturing printed circuits using Riston (Registered Trade Mark) photoresist material. Certain of the etched tracks receive the styli and others define the locations for the register stage chips constituting the two shift registers. The styli are formed on the end portions of the tracks in area $Z_1$ by bonding a strip of Riston material to this stylus area, forming 125 $\mu m \times 260$ $\mu m$ windows in the Riston film over the end portions of the tracks at the stylus positions, and electrolytically depositing a conductive material which is resistant to abrasion onto the copper tracks via these windows. For example, a first layer of nickel with a Vickers hardness of 400 is deposited on the copper, followed by a layer of chromium with a Vickers hardness of 1000 deposited on the nickel. If the electrosensitive paper used is of the type requiring styli containing silver, a silver alloy is deposited through the windows in the Riston film. This process thus forms styli which are parallelpipedal to the thickness of the windows. The conductive tracks along each longitudinal edge of the stylus area are covered over a width of approximately 1 millimeter with an insulating lacquer or an insulating tape or a self-adhesive insulating tape (for example, of the material available under the Registered Trade Mark Teflon). This forms insulative strips 21 and 22 preventing any contact between the conductive tracks and the electrosensitive paper during printing.

The stylus bar command sections are formed by tinning the respective chip locations and applying the chips to the support using the known TAB process, whereby the chips are initially mounted on a tape and then transferred to the stylus bar support.

Inputs b, $V_1$, $V_2$, RAZ and H of each chip are connected to the corresponding input terminals of the register thus formed by means of the conductive strip along each longitudinal edge of the stylus bar support, comprising five mutually insulated conductive layers.

Figure 4:
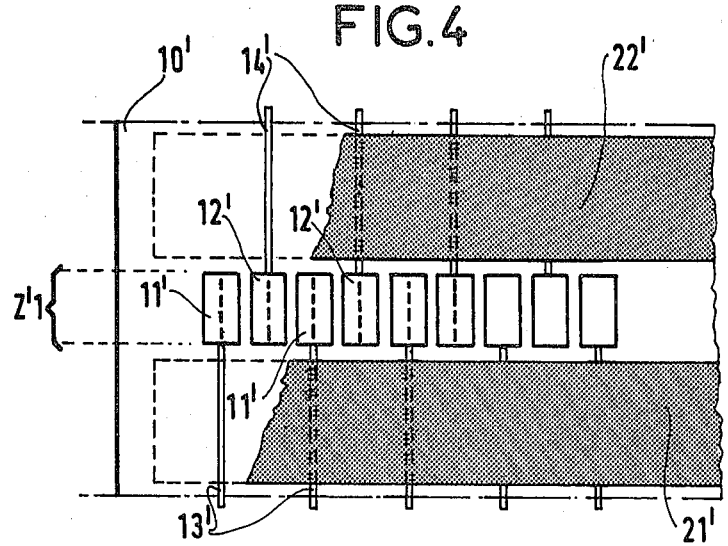
FIG. 4 shows a modified version of the embodiment shown in FIG. 3.

FIG. 4 shows a modified version of the unitary construction stylus bar shown in FIG. 3, the modification affecting the stylus area and the adjacent parts of the connection areas. In FIG. 4, the primed references indicate components corresponding to those similarly referenced (without primes) in FIG. 3. The stylus area $Z'_1$ on support 10' comprises 1728 styli 11', 12' etc, but in this embodiment they are arranged in a single row with a pitch of 125 $\mu m$, the dimensions of the surface which comes into contact with the paper being 90 $\mu m \times 260$ $\mu m$. The conductive tracks 13' and 14' are as before arranged as two arrays on either side of the single line of styli, and their end portions carrying the respective styli are interleaved with one another (the end portions in one array are interleaved with the end portions of the other array in the stylus area). Thus in the stylus area the end portions of the tracks are pitched at 125 $\mu m$.

The conductive tracks on support 10' in the stylus area and at the same pitch as the 1728 aligned styli are obtained by etching a cold-rolled copper strip bonded to the support using a known method (less common than the photoresist method) employing photosensitive lacquers. The etched tracks are substantially 40 $\mu m$ wide and 9 $\mu m$ thick. The styli are formed on the end portions of the tracks by electrolytically depositing a conductive material resistant to abrasion (nickel or possibly silver alloy) on the end parts of the conductive tracks, through a single window in a Riston photoresist film, the window extending along the length of the stylus area (216 mm) and across its width (260 μm). The Riston film is applied to the etched support. The thickness of the material electrolytically deposited on the end parts of the tracks is limited to some 20 μm to avoid the possibility of short-circuits between adjacent tracks. An insulative lacquer or a self-adhesive insulative tape 21' or 22' (for example of the material marketed under the Trade Mark "Teflon") is applied along each longitudinal edge of the line of styli, over a width of approximately 1 mm. The insulating strips 21' and 22' insulate the conductive tracks from the electrosensitive paper with which the styli are in contact during printing.

Figure 5:
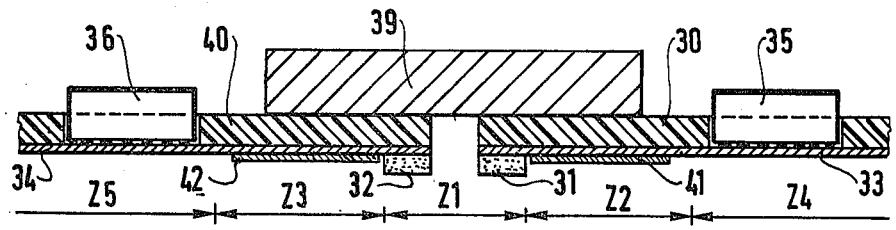
FIG. 5 shows an alternative embodiment of the stylus bar.

FIG. 5 represents another unitary construction embodiment of the stylus bar in accordance with the invention, shown schematically in cross-section. The stylus bar comprises two films 30 and 40 each carrying an array of conductive tracks 33, 34 (the arrays of tracks not visible in this figure are similar to those shown in FIGS. 1 and 3). One end of each track carries a stylus 31, 32, etc. On films 30 and 40, respective insulating strips 41 and 42 are placed over the conductive paths along the row of styli, to avoid contact between the conductive tracks and the electrosensitive paper during printing. Each film carries m register stage chips 35, 36, etc, the inputs and outputs of which are not shown in this figure but are similar to those of FIGS. 1 and 3. The register outputs are soldered to the end parts of the tracks of said arrays adjacent the respective other ends of these tracks. The other inputs are soldered to additional tracks (not shown in this figure, but similar to the additional tracks 19 shown in FIG. 3). The two films 30 and 40 are symmetrically equipped and mounted head-to-tail on support 39 and bonded thereto, the arrangement being such that the styli form two rows separated by a distance equal to the width of each line of styli, the styli in each row being aligned with the gaps between styli of the other row. The stylus area Z1 is defined by the two facing edges of the films and the gap therebetween. Command areas Z4 and Z5 are formed by the serially-connected register stage chips on each film. Connection areas Z2 and Z3 are occupied by the tracks of the two arrays on the respective films, extending between stylus area Z1 and the respective command area Z4 or Z5.

The stylus bar is manufactured as follows. A row of locations for the register stage chips is defined on a film from which the two films 30 and 40 will be taken. Juxtaposed sets of tracks are etched into a cold-rolled copper layer bonded to this original film. In each set, the tracks originate at a register stage chip location and a first group of tracks, corresponding to the register outputs of the pad, are brought out to the same edge of the film, along which they ae regularly distributed within each set of tracks and from one set of tracks to the next, by the pitch separating styli of the stylus bar in the same row (250 μm). The remaining tracks form a second group corresponding to the other inputs of the chip and are brought out to the other edge of the film, the last track being connected to the first track of the second group of tracks of the next adjacent set of tracks. Styli are formed on the track end portions regularly spaced along the film edge, by electrolytically depositing the stylus material. A strip of insulating material is then deposited along the line of styli, using the method previously described with reference to the stylus bar shown in FIG. 3.

The register stage chips are then mounted on the film, at the appropriate locations, the inputs and outputs of each chip being soldered to the corresponding tracks, in the Inner Lead Bonding (ILB) phase of the TAB process.

Note that the layout of the tracks and chip locations is such that two symmetrical systems are obtained, juxtaposed on the film. The film is cut along the ends of the connecting tracks and then divided to produce films 30 and 40, each carrying one shift register. A multilayer conductive strip similar to those described with reference to FIG. 3 is then laid along the edge to which the additional tracks (second group tracks) are brought out. This strip provides the parallel connection between like inputs, excepting the serial data inputs, of the chips on the film in question. The two films are then arranged in head-to-tail configuration and bonded to the support 39.

In an alternative arrangement (not shown) readily deduced from the arrangement shown in FIG. 5, the stylus bar comprises a single film instead of films 30 and 40. In this case, the width of the single film is substantially twice that of film 30 or 40, being formed with two parts which, apart from a longitudinal offset, are substantially symmetrical relative to the median longitudinal axis of the film. These parts carry systems similar to those on films 30 and 40, respectively.

A strip of cold-rolled copper bonded to the single film is etched to form two rows of register stage chip locations adjacent respective longitudinal edges of the film, the conductive tracks of the two arrays and the associated additional conductive tracks, the tracks originating at the respective locations and forming two juxtaposed sets occupying respective halves of the single film. In each set of tracks, the tracks originate from a chip location and a first group of these tracks corresponding to the register outputs of the chip are routed to the vicinity of the median line of the film, at which the end portions of the tracks of the first group, constituting the respective circuits on the two halves of the film, are regularly distributed at the required stylus pitch. The remaining tracks form a second group corresponding to the other inputs of the chip and are routed to the vicinity of the respective longitudinal edge of the film, the last track being connected to the first track of the second group of tracks of the next adjacent set of tracks. The etching operation is carried out as described with reference to FIG. 3. A gap corresponding to the width of a scanning line (260 μm) is provided between the regularly spaced end portions of the tracks of the two arrays in the vicinity of the median line of the film, and an offset between the tracks of the two arrays formed on the respective halves of the film, the track ends of one array being arranged opposite the intervals between track ends in the other array. The chips are then mounted and their inputs and outputs connected to the tracks in the ILB phase of the TAB process. The styli are then formed and an insulating strip deposited on either side of the two rows of styli, a multilayer conductive film being deposited in the vicinity of each longitudinal edge of the film, as previously described with reference to FIG. 3. This provides, after a final operation of cutting the film, the required array and its association with a support. Note that as an alternative a single row of styli may be formed on the single film, adjacent the median line of the film, the end portions of the tracks of one array being then positioned between the end portions of the tracks of the other array adjacent the aforementioned median line. The tracks and styli are formed using the process previously described with reference to FIG. 4.

Figure 6:
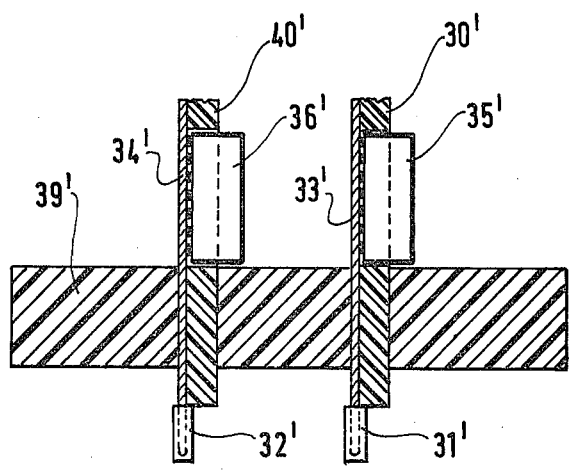
FIG. 6 shows a modification to the embodiment shown in FIG. 5.

FIG. 6 shows another embodiment of unitary construction stylus bar in accordance with the invention. The primed references denote the corresponding components similarly referenced, without primes, in FIG. 5. The stylus bar shown in FIG. 6 also comprises two films 30' and 40', each with an array of conductive tracks 33' and 34', first end portions of which extend to a first longitudinal edge of the film, supporting the tracks. These first and portions of the tracks carry styli 31' and 32'. Films 30' and 40' also carry register stage chips 35' and 36', of which there are m on each film. The register outputs of these chips are soldered to respective second end portions of the array tracks. The other inputs are soldered to respective additional tracks (not shown), similar to those shown in FIG. 3. Films 30' and 40' form identical devices and are mounted parallel to one another (in other words, virtually superposed on one another) on a mechanical support 39' to which they are bonded, so defining two rows of styli projecting beyond the films and the support assembly 39' on the same side, and two rows of register stage chips on the other side of the support 39'. The styli of one row are between the styli of the other row.

To produce a stylus bar as shown in FIG. 6, a film whose width is similar to that of the final height of the stylus bar has bonded to it a cold-rolled copper strip 35 μm thick, extending beyond one of its longitudinal edges. The copper tracks of the two arrays are then formed, projecting beyond the aforementioned longitudinal edge. Also formed are the additional tracks which extend to the other longitudinal edge. The chips are then mounted and their inputs and outputs soldered to the tracks in the ILB phase of the TAB process. The styli are then formed on the projecting end portions of the tracks. The film is then cut to provide the two films 30' and 40', to each of which a multilayer conductive strip similar to those described previously is applied, in the vicinity of the edge to which the additional tracks are brought out. The two films 30' and 40' are then disposed parallel to one another, separated by a distance of approximately 420 μm. They are then bonded to the support assembly, offset relative to one another by one-half the stylus pitch. Note that in this embodiment it is the front part of each stylus which scans the electrosensitive paper on printout. The surface area of this front part is defined by the thickness of the electrolytically deposited stylus material and the width of the window through which the material is deposited (approximately 60 μm×125 μm). This end portion prints a point as the paper advances. A line 260 μm high will be printed in slightly under 20 ms.

Note also that in this embodiment the points of the even rows and those of the odd rows successive scanning lines are printed simultaneously by the styli.

Figure 7:
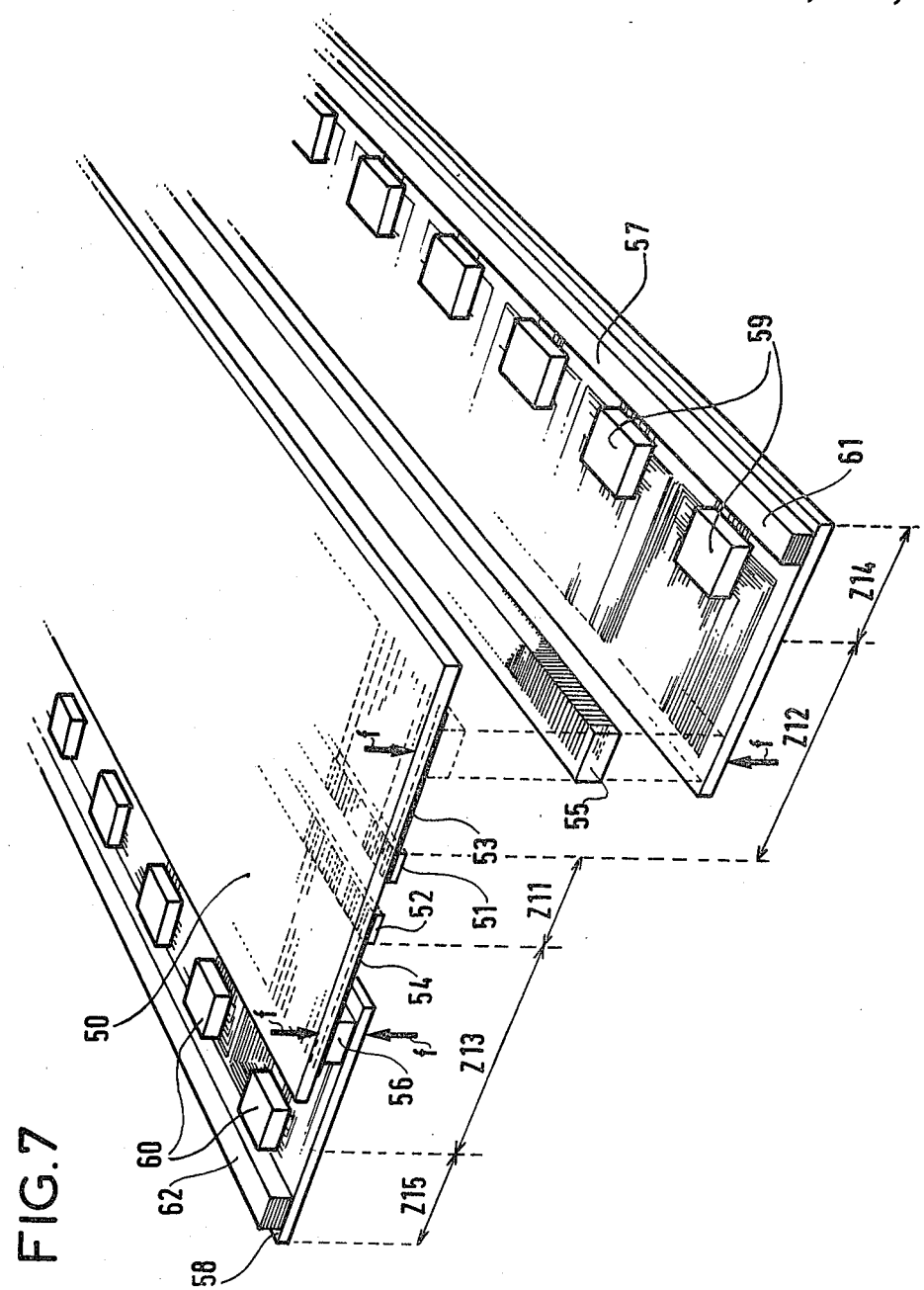
FIG. 7 shows a further embodiment of the stylus bar.

FIG. 7 is a schematic representation of another embodiment of the stylus bar in accordance with the invention. In this embodiment the styli, which are subject to wear, may be replaced independently of the two shift registers formed by the register chips included in the stylus bar in accordance with the invention.

The stylus bar comprises a stylus area $Z_{11}$, two connection areas $Z_{12}$ and $Z_{13}$ and two command areas $Z_{14}$ and $Z_{15}$. The stylus area $Z_{11}$ comprises 1728 styli 51, 52, etc, in two spaced rows. They are at the first ends of conductive tracks 53, 54, etc on a support 50 on which they constitute two arrays. Said first ends of the tracks of the two arrays extend away from the styli, being regularly spaced within each array in a first longitudinal area of the support 50, substantially centrally placed and constituting the stylus area $Z_{11}$. The second ends of the tracks of the two arrays, also regularly spaced in each array, extend into two second longitudinal areas on the support 50, on either side of the stylus area and adjacent the longitudinal edges of the support 50. As shown in FIG. 7, the tracks of the two arrays are advantageously rectilinear and parallel.

Each of command areas $Z_{14}$ and $Z_{15}$ is defined on a respective film 57 or 58, carrying m register stage chips 59, 60 etc arranged in series to constitute a shift register. On each film 57 or 58 the register stage chip register outputs are regularly spaced at the same pitch as the second ends of the tracks (in other words, at the track pitch) of either array, extending along the same longitudinal edge of the film which carries the chips. The inputs and output s of each chip are brought out towards the other edge of the film, adjacent which the chips are connected in series. Along this edge of film 57 or 58 is a multilayer conductive strip 61 or 62, respectively, the conductive layers in which are insulated from one another and connect in parallel like inputs of the chips, with the exception of the serial data inputs e. Command areas $Z_{14}$ and $Z_{15}$ comprise the respective areas on films 57 and 58 occupied by the chips and their interconnections. Each of connection areas $Z_{12}$ and $Z_{13}$ comprises a respective strip 55 or 56 of an elastomer material with anisotropic or "zebra" type conductive areas, such as the connection strips marketed by CHOMERICS under the Trade Mark "CHO-NECTOR". The strips 55 and 56 are sandwiched between support 50 and films 57 and 58, respectively, along the second ends of the tracks on the support and the register outputs of the chips brought out to the same longitudinal edge of each film. Connection areas $Z_{12}$ and $Z_{13}$ are formed by connecting strips 55 and 56, respectively, in conjunction with the areas of support 50 adjacent stylus area $Z_{11}$ and carrying, except for their first ends, tracks 53 and 54, the second ends of which are in contact with the respective connection strip, and in conjunction with the respective area 57 or 58 of the film adjacent the control area defined on the film and carrying the register outputs of the chips in contact with the respective connecting strip. Note that films 57 and 58 are connected in head-to-tail configuration and carry symmetrically disposed circuit arrangements.

In a modified embodiment (not shown) readily deduced from that of FIG. 7 and that of FIG. 4, the end portions of the tracks carrying the styli are interleaved with one another so that the styli are disposed in a single line or row, in a stylus area formed on a support similar to support 50 and carrying tracks similar to tracks 53 and 54, arranged in two arrays.

A stylus bar with stylus area $Z_{11}$ which is replacable independently of the command areas is manufactured as follows: stylus area $Z_{11}$ and the parts of connection areas $Z_{12}$ and $Z_{13}$ integral therewith are obtained by etching a strip of cold-rolled copper bonded to support 50 to form conductive tracks 53, 54, etc. An electrically conductive material which is resistant to mechanical abrasion is then deposited electrolytically onto the first ends of the tracks to form the styli. These operations are similar to those previously described with reference to FIG. 3, for obtaining the tracks and styli of the unitary construction stylus bar or with reference to FIG. 4, including the use of an insulative lacquer or self-adhesive tape (not shown) placed on either side of the stylus area to cover the tracks of the two arrays adjacent the stylus area (excluding the second ends of the tracks), so as to avoid contact between the tracks and the electrosensitive paper during scanning.

Command areas $Z_{14}$ and $Z_{15}$ and the parts of connection areas $Z_{12}$ and $Z_{13}$ integral therewith are formed directly usig the film on which the register stage chips are mounted in the ILB phase of the TAB process. This process is used only partially, the step in which the chips are transferred from the film to support 50 being omitted. Thus the film is used as the final support. The register outputs of the chips of each register are brought out to the same edge of the film, spaced at the same pitch as the ends of the conductive tracks to which they will be connected by additional tracks previously formed on the film. The respective inputs and outputs of the chips are brought out to the other edge, where the chips are connected in series by further additional tracks previously formed on the film. The film is then simply cut to length to obtain films 57 and 58 carrying the respective shift registers, on each of which is deposited the respective multilayer strip 61 or 62 providing the parallel connection of the chip inputs. Note that in FIG. 7 the register stage chips and their input and output connections extending to the edges of the film 57 or 58 are shown on the same side of the film, for purposes of clarity. In practice, the chips would be mounted in the ILB phase of the TAB process on the side of the film opposite that carrying the input and output connections to the film edges.

The known connecting strips 55 and 56 are sandwiched between support 50 and films 57 and 58, respectively, in other words between the ends of the tracks on support 50 and the chip register outputs to be connected. As represented schematically on FIG. 7 by arrows f, a simple mechanical system applies pressure to obtain good mechanical contact between support 50, connecting strip 55 or 56 and film 59 or 60 carrying the chips. It will be understood that when applying connecting strips 55 and 56, the respective film 59 or 60 will be carefully positioned so that each register output corresponds to a track end, these being connected via the connecting strip independently of the other register outputs and the ends of other tracks.

Figure 8:
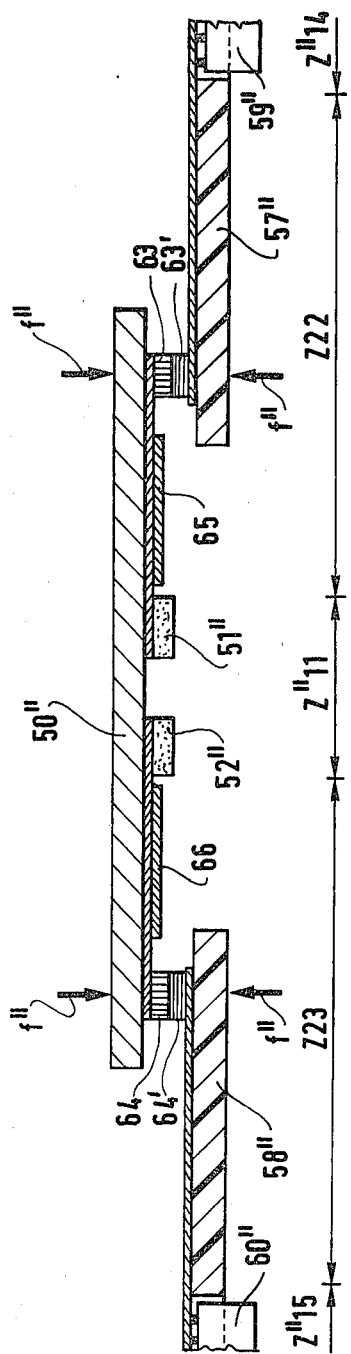
FIG. 8 shows a modification to the embodiment shown in FIG. 7.

FIG. 8 is a cross-section through an embodiment in which the stylus bar connection areas are modified as compared with those of FIG. 7. In FIG. 8, the double primed references designate components analogous to those similarly referenced, without primes, in FIG. 7. Connection areas $Z_{22}$ and $Z_{23}$ are defined on support 50″ carrying, adjacent stylus area $Z''_{11}$, respective conductive tracks 53″, 54″, etc (excepting the first ends thereof) of the two arrays, carrying styli 51″, 52″, etc, extending into area $Z''_{11}$, and also on respective films 57″ and 58″ on which, adjacent the respective command area $Z''_{14}$ or $Z''_{15}$, are the register outputs of register stage chips 59″, 60″, etc of the command area defined on the respective film, brought out adjacent the same edge of the film.

In each of connection areas $Z_{22}$ and $Z_{23}$, the regularly spaced second ends of the tracks of the array are each covered with an electrically conductive material such as gold or palladium to form respective contact tabs 63, 64. The register outputs are also brought out to the vicinity of the corresponding longitudinal edge of the film and are also covered with the same electrically conductive material to form contact tabs 63′, 64′. In each connection area $Z_{22}$ and $Z_{23}$, the tabs 63 and 64 on the tracks in one row and the tabs 63′ and 64′ on the register outputs in another row are brought into contact with one another to interconnect the respective tracks and register outputs.

FIG. 8 also shows the two insulating strips 65 and 66 on each side of the stylus area and along the longitudinal edges thereof to prevent contact between the tracks and electrosensitive paper during scanning.

In the stylus bar shown in FIG. 8, the styli are arranged in two rows as in the stylus bar shown in FIG. 7. As an alternative, the styli may be arranged in a single row as in the previously described modified version of the stylus bar shown in FIG. 7 (this modified version is not shown in the drawings).

Stylus area $Z_{11}$ on support 50″ and the parts of connection areas $Z_{22}$ and $Z_{23}$ integral therewith in the stylus bar shown in FIG. 8 (or the version thereof with the modified stylus area) are made up as described with reference to constituting on support 50 stylus area $Z_{11}$ and the parts of connection areas $Z_{12}$ and $Z_{13}$ integral therewith in the stylus bar shown in FIG. 7 (or the version thereof with modified stylus area), and by forming contact tabs 63, 64 etc on the second ends of conductive tracks previously formed on support 50″. The two command areas $Z''_{14}$ and $Z''_{15}$ and the parts of connection areas $Z_{22}$ and $Z_{23}$ associated therewith in the stylus bar as shown in FIG. 8 are produced in the same way as command areas $Z_{14}$ and $Z_{15}$ and the parts of connection areas $Z_{12}$ and $Z_{13}$ integral therewith in the stylus bar as shown in FIG. 7, and by forming contact tabs 63′, 64′ etc on the register outputs of the register stage chips brought out at the pitch of the track ends to which they are respectively connected.

The contact tabs 63, 64, 63′, 64′, etc are formed by bonding a film of Riston to each of the two areas on support 50″ carrying said second ends of the tracks of respective arrays, and on each of films 57″ and 58″ in the vicinity of the longitudinal edge to which the register outputs of the chips are brought out, forming windows in Riston film at the locations of the tabs, and electrolytically depositing through said windows the material of the tabs (gold or palladium, for example).

The two rows of tabs carried by the tracks on the support are they brought into contact with the two rows of tabs carried by the respective films, with each register output tab aligned with the corresponding tab on a track. As shown schematically in FIG. 8 by arrows f″, a mechanical system is used to maintain the tabs in contact with one another.

In the various embodiments of the stylus bar in accordance with the invention described hereinabove, it may be advantageous in the case of certain practical embodiments to omit the multilayer conductive strips from the or each substrate carrying the register stage chips and to connect the respective b, $V_1$, $V_2$, RAZ and H inputs (FIG. 1) of the chips forming each shift register in parallel by means of tracks formed on the surface of the substrate supporting the chips opposite that carrying the input connections, being connected to respective chip inputs by means of metal-plated through-holes formed for this purpose in the substrate. Alternatively, to reduce the bulk of the substrate, the parallel connections may be made externally of the substrate, the appropriate input connections to the chips on the substrate and in the vicinity of the same longitudinal edge thereof being tinned, for example, to enable the parallel connection to be made externally by soldering.

Figure 9:
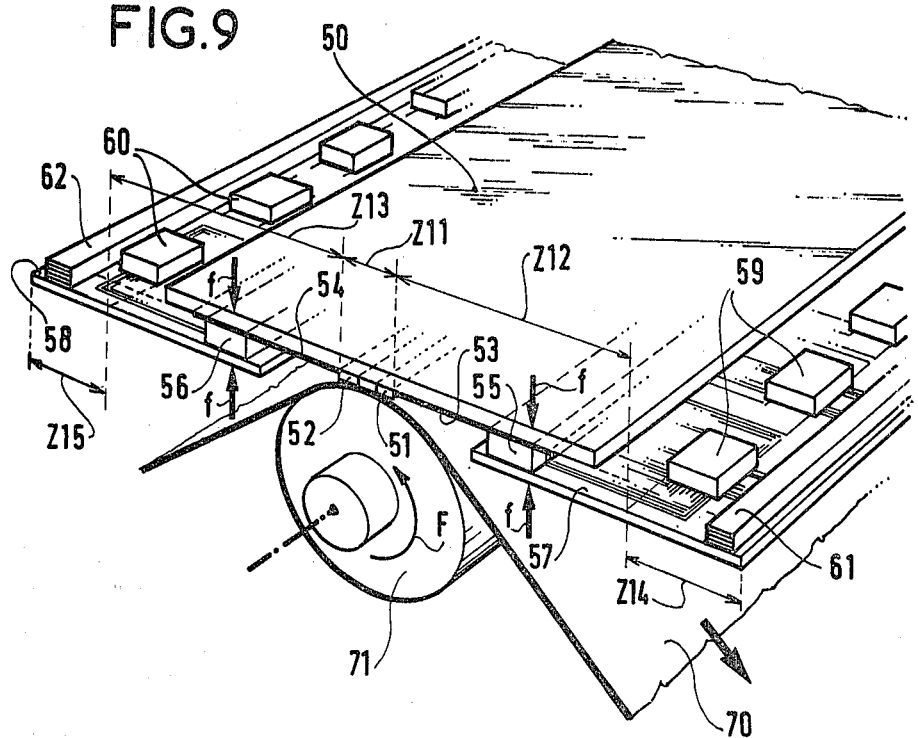
FIGS. 9 and 10 show respective types of stylus bar using the arrangement shown in FIG. 7.

FIG. 9 shows a stylus bar as shown in FIG. 7, the same reference numerals being used for the various components thereof. In this figure, support 50 is rigid and the stylus bar 70 is flat. The electrosensitive paper 70 is drawn across a roller 71 aligned with stylus area 51–52. The roller acts as a mechanical reference for the paper feed control function (schematically represented by arrow F on the roller end), the stylus bar being applied to the paper.

Figure 10:
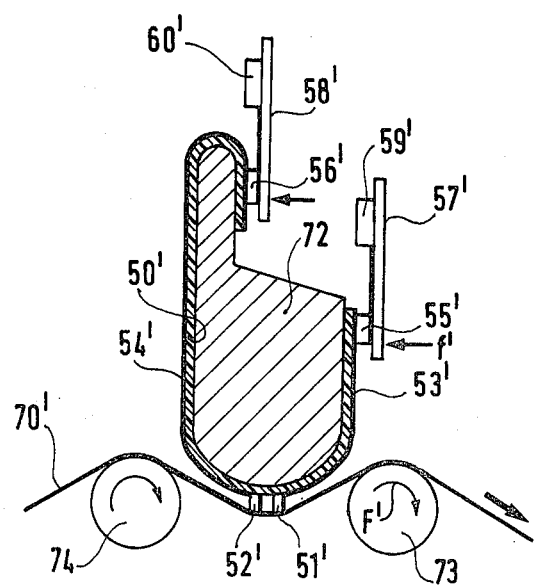

FIG. 10 is a schematic representation of a stylus bar as shown in FIG. 7 in which, seen in cross-section perpendicular to its length, the stylus area forms a circular arc against which the electrosensitive paper to be printed on is applied. Only the principal components of the stylus bar are shown in this figure, in which support 50' (similarly equipped to support 50) is flexible. It is bonded to a rigid auxiliary support 72, part of the outside surface of which is part-circular in cross-section. Stylus area 51', 52' is supported on this rounded portion. The electrosensitive paper 70' passes over rollers 73 and 74 disposed one on each side of the rounded portion of the stylus bar. The paper contacts and is tensioned by this rounded portion. Roller 73 forms a mechanical reference for the paper feed control function (represented schematically by arrow F' on the roller end), and the paper contacts the stylus area of the stylus bar.

In the embodiment shown in FIG. 10, the stylus area is not on the median portion of support 50', but offset to one side thereof. This enables the width of the stylus bar to be reduced. The wider part of support 50' is folded under rigid auxiliary support 72, which is chamfered for this purpose, as clearly shown in FIG. 10. The film carrying the chips and corresponding connection strip 58', 56', 57', 58' being situated in line with this chamfer. In this arrangement, films 57' and 58' carrying the register stage chips are identically equipped.

It will be realised that the two types of implementation shown in FIGS. 9 and 10 are applicable to the various embodiments hereinbefore described. Stylus bars using a rigid support would be flat, whereas those using a flexible support would be formed around a rigid auxiliary support of the appropriate shape.

The operation of the stylus bar in accordance with the invention will now be described. The data D to be reproduced on each scanning line on the electrosensitive paper is obtained by analysing each scanning line on a document to be reproduced. Odd and even data DI and DP, respectively, are derived from the data D for a single line or two lines, according to whether the styli of the stylus bar are arranged in one or two rows. Data DI and DP are input to the two shift registers formed by the register stage chips of the two command areas, to feed the odd ranked and even ranked styli, respectively, in the stylus area.

A stylus bar in accordance with the invention and in any of the embodiments described hereinbefore, with the exception of that shown in FIG. 6, operates by executing the following three basic operations in succession:

each of the two registers is loaded with odd and even data DI and DP, respectively, corresponding to the line or lines scanned by the styli, applied to input e of the respective register at a rate set by the respective register clock H, the parallel outputs being disabled in logic level "1" (in the aforementioned example), such that the paper colour is not changed;

the points corresponding to data DI and DP loaded into respective registers are printed, the register outputs being enabled for this purpose;

the electrosensitive paper is advanced by one pitch relative to the stylus bar, the parallel outputs being forced to level "1" (in the aforementioned example), so that the paper colour is not changed.

By way of example, for an overall duration of the above three operations of 20 ms, loading is completed in 1.33 ms (H=650 kHz to load 864 data items into each register of the stylus bar), the printing operation is completed in 8.67 ms, and the paper feed operation is completed in 10 ms.

In the case of a stylus bar as shown in FIG. 6, the points are marked as the paper is advanced, the register stages being reset to zero at the end of the paper feed operation, which has a duration of 18.67 ms, for example. In this case the register load operation duration is 1.33 ms.

There follows a description of a specific embodiment of control logic for a printing device using a stylus bar with the electrical circuitry shown in FIG. 1, with two separated rows of styli. The printer and a transmitted data output unit (not shown) are subsystems of a facsimile receiver.

The printer, comprising the control logic and stylus bar, produces a facsimile of a document on electrosensitive paper scanned in successive lines, on the basis of data D from the data output unit and timing data, also obtained from the data output unit.

Figure 11:
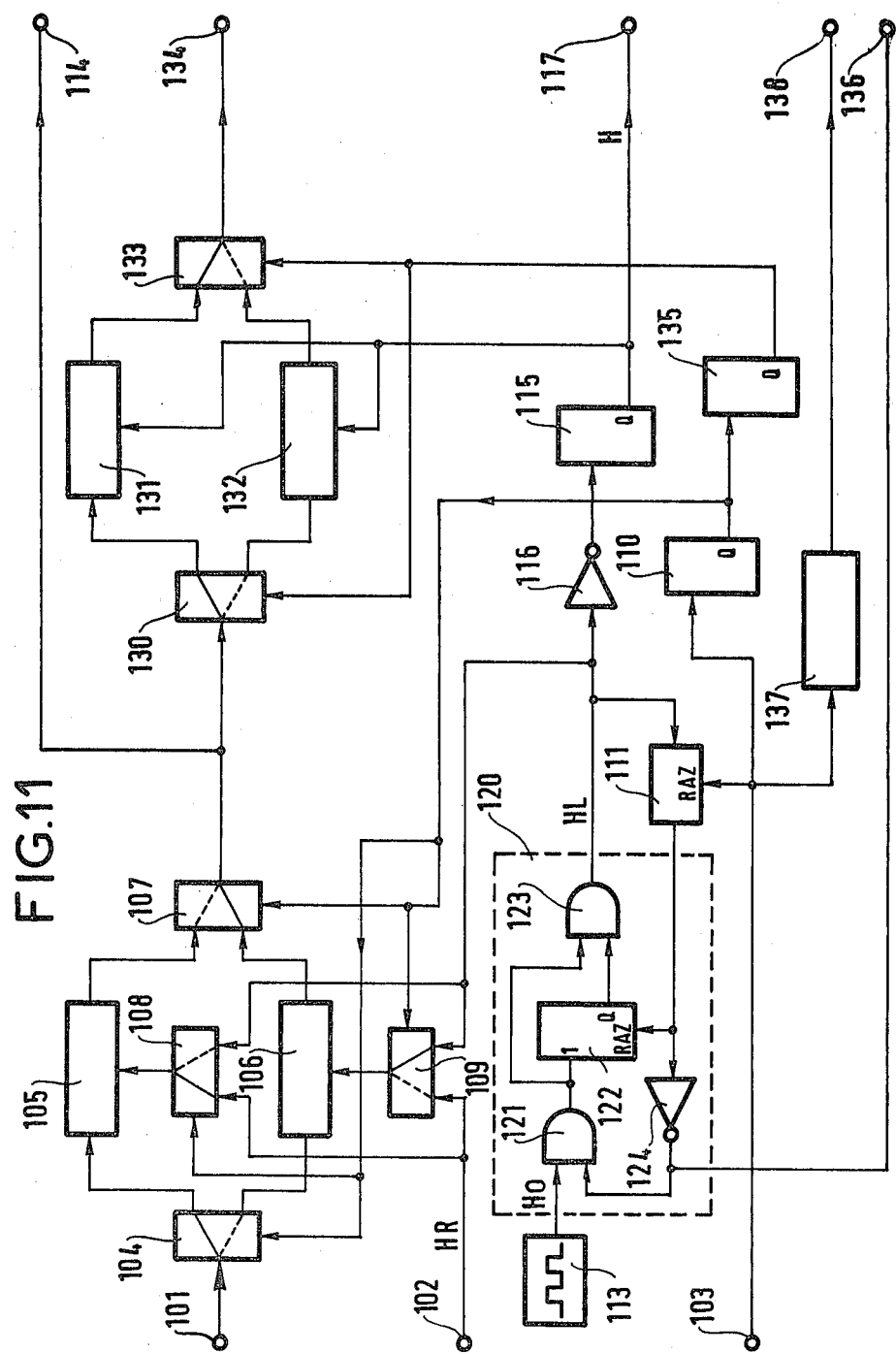
FIG. 11 is a block schematic showing the stylus bar control logic.

FIG. 11 shows only the control logic, the stylus bar being as shown in the other figures.

The control logic constitutes the input stage of the printer. It receives on input 101 the data D from the data output unit, timed by the data output unit clock HR. This data D is a binary representation of the colour (black or white) of consecutive points along each scanning line. Data D is input serially to input 101, timed by data output unit clock HR. Input 102 of the control logic receives this clock signal HR. In data D, logic "0" represents "white" and logic "1" represents "black".

Data D from the facsimile receiver data output unit, timed by signal HR, forms groups corresponding to respective scanning lines, the first data items in consecutive groups being separated by a time interval which may be variable but which is always greater than a defined minimum interval, in this instance 20 ms. This minimum time interval is the minimum time required to send the content of one analysis line followed by a line synchronising word (a filler word is sent immediately before the synchronising word, if necessary), in other words the minimum time interval separating end of transmission of two synchronising words. On reception, the data items D defining the respective first points on the two consecutive lines to be reproduced are therefore separated by at least this minimum interval of 20 ms. The data output unit detects the synchronising words to output a signal indicating the start of a scanning line on the document to be reproduced.

A switching circuit 104 connects input 101 to buffer memories 105 and 106, each comprising a shift register whose capacity is equal to the number of points per scanning line, 1728 in this instance. A switching circuit 107 with two inputs and one output is connected to the outputs of buffer registers 105 and 106, each of which has its "shift" control input connected to a respective switching circuit 108 or 109, to receive either clock signal HR from input 102 or clock signal HL (see below). In this example, the data in registers 105 and 106 is clocked on the falling edges of clock signal HR or HL.

The Q output of a flip-flop 110 controls switching circuits 104, 107, 108 and 109. Its control input is connected to input 103 of the control logic to receive a short "line change" pulse each time the data output unit has output the data D corresponding to a complete scanning line (in other words, at the end of detection of each line synchronisation word). At the end of the document, this input also receives a short pulse on completing reproduction of the last line but one and on starting reproduction of the last line of the document. With the flip-flop output at zero (as shown in the diagram), register 105 receives on its load input the data D at input 101, clocking this data at the rate set by clock signal HR which is applied to register 105 at this time. Simultaneously, register 106 is outputting data through switching circuit 107, under the control of signal HL applied to the shift input of register 106 at this time. For the other output state of the flip-flop (not shown), the functions of registers 105 and 106 are reversed: register 105 outputs data under the control of signal HL and register 106 is loaded under the control of signal HR.

The control logic further comprises a counter 111, whose capacity is 1728 (1728 points per scanning line). The input of this counter is connected to receive signal HL which controls the output of data from registers 105 and 106 alternately, to count the data items output by the registers alternately. The counter output is at binary "1" or binary "0", indicating whether the count value is equal to 1728 or not. The counter has a reset input connected to control logic input 103. The output signal of counter 111 controls a circuit 120 which disables a clock signal $H_O$ of frequency 2.H and cyclic ratio unity (H=650 kHz in the previous example). This signal is obtained from a clock 113 connected to this disable circuit. The output of the disable circuit provides clock signal HL. The disable circuit includes a two-input AND gate 121 which receives signal $H_O$ and the output signal from the counter, through inverter 124. The output of gate 121 is connected to a "1" input of a flip-flop 122, so as to set the Q output of this flip-flop to "1" on each falling edge of its input signal. The output of AND gate 121 is also connected to one input of another AND gate 123, a second input of which is connected to output Q of flip-flop 122. The output of AND gate 123 carries signal HL. The reset input RAZ of flip-flop 122 receives the output of counter 111, to force the flip-flop output to "0" when the counter state is 1728.

The circuit is such that AND gate 121 blocks or passes clock signal $H_O$, according to whether the state of counter 111 is 1728 or not. Flip-flop 122 and AND gate 123 provide a minimum time-delay (in this instance, one half-period of clock 113) on appearance of the first positive-going pulse of signal HL, following resetting to 0 of counter 111, initially at 1728. They also impose a predefined width on this first pulse.

Suppose the register outputting data is register 106. When the data corresponding to a complete scanning line has been extracted from this register, counter 111 is in state 1728 and disable circuit 120 blocks signal HL. While register 106 is outputting data, register 105 is being loaded with the data D relating to the next scanning line, timed by signal HR. The "line change" pulse from the data output unit on input 103 causes flip-flop 110 to reverse the functions of registers 105 and 106, and resets counter 111 to 0. This re-enables signal HL to unload register 105 while register 106 is loaded with new data D. The output of switching circuit 107 is connected alternately to the output of register 105 and that of register 106, to receive a signal comprising packets of data D. The data in each packet corresponds to a complete scanning line and is output at rate 2h. Consecutive packets are separated by a time interval at least equal to that required to print two points on the electrosensitive paper and execute one line feed.

The output signal from switching circuit 107 is connected to a first data output 114 of the control logic. It is associated with clock signal H for the two registers of the stylus bar, delivered to clock output 117 of the control logic by the Q output of a flip-flop 115, the control input of which receives signal HL through an inverter 116. The Q output of flip-flop 115 changes state on each rising edge of signal HL. The signal on output 114 changes state on the rising edges of the signal at output Q of flip-flop 115, and constitutes the odd data DI delivered to input e of the relevant register of the stylus bar (register 8, FIG. 1), at rate H.

The output signal of switching circuit 107 is input through a switching circuit 130 to buffer memories 131 and 132, each comprising a shift register with a capacity of 1728 (1728 points per scanning line). Another switching circuit 133 is connected to the outputs of registers 131 and 132, its output being connected to a second data output 134 of the control logic. Each of registers 131 and 132 has a shift input connected to output Q of flip-flop 115 to receive signal H. Data is clocked in these registers on the falling edges of the signal at output Q of flip-flop 115.

Switching circuits 130 and 133 are controlled by the signal on the Q output of another flip-flop 135, with a control input connected to output Q of flip-flop 110. The Q output of flip-flop 135 changes state on every second "line change" pulse. When the output of flip-flop 135 is at "0" (as shown in the diagram), this state being maintained during two successive scanning lines defined at 103, register 131 receives on its loading input the data signal from switching circuit 107, acquiring this data on the falling edges of signal H. The data in register 131 corresponds to the even ranked points (even points) of two consecutive scanning lines, the odd points of which are defined by data DI at output 114 of the control logic, simultaneously with the loading of register 131. While register 131 is loading, register 132 is simultaneously unloading to switching circuit 133, also on the falling edges of signal H. Data similar to that loaded into register 132 (in that it defines the even points and is therefore designated DP) but relating to the preceding two scanning lines is present at output 134 of the control logic.

For the other output state of flip-flop 135, the functions of registers 131 and 132 are changed over as compared with the previous case.

Registers 131 and 132 alternate in adopting the function of storing in succession the two groups of data defining the even points on two consecutive scanning lines, while the control logic provides on output 114, in succession, the two groups of data DI of the consecutive scanning lines in question and, on output 134, in succession, the two groups of even data DP of the two consecutive scanning lines preceding those in question. Thus the signal at output 134 of the control logic is the even data DP delivered at rate H to input e of the other register of the stylus bar (register 7, FIG. 1).

The control logic also generates the control signals for the two registes of the stylus bar. The signal disabling the respective outputs of the two registers when at "1" (b, FIG. 1) comprises the output signal of counter 111, complemented by inverter 124. This disabling signal is present on output 136 of the control logic, which is connected to the output of inverter 124. The signal resetting the register stages to zero when at "1" (RAZ, FIG. 1) is obtained at the output of a monostable 137 whose input is connected to control logic input 103, to receive the "line change" pulses. The output of this monostable is connected to control logic output 138. Each "line change" pulse sets the output signal of monostable 137 to "0" for a predetermined period during which the registers of the stylus bar are loaded with the data from outputs 114 and 134 of the control logic (timed by signal H on output 117) and the data is printed on the paper.

On starting a copying operating, registers 105, 106, 131 and 132 and flip-flops 110, 115 and 135 are initialised to the "0" state. Counter 111 is initialised to 1728. The latter initialisation requirement may be eliminated by connecting to the output of counter 111 an AND gate (not shown) controlled by the output signal of a further flip-flop (not shown) initialised to state "0" and set to state "1" by the "line change" pulses.

Figure 12:
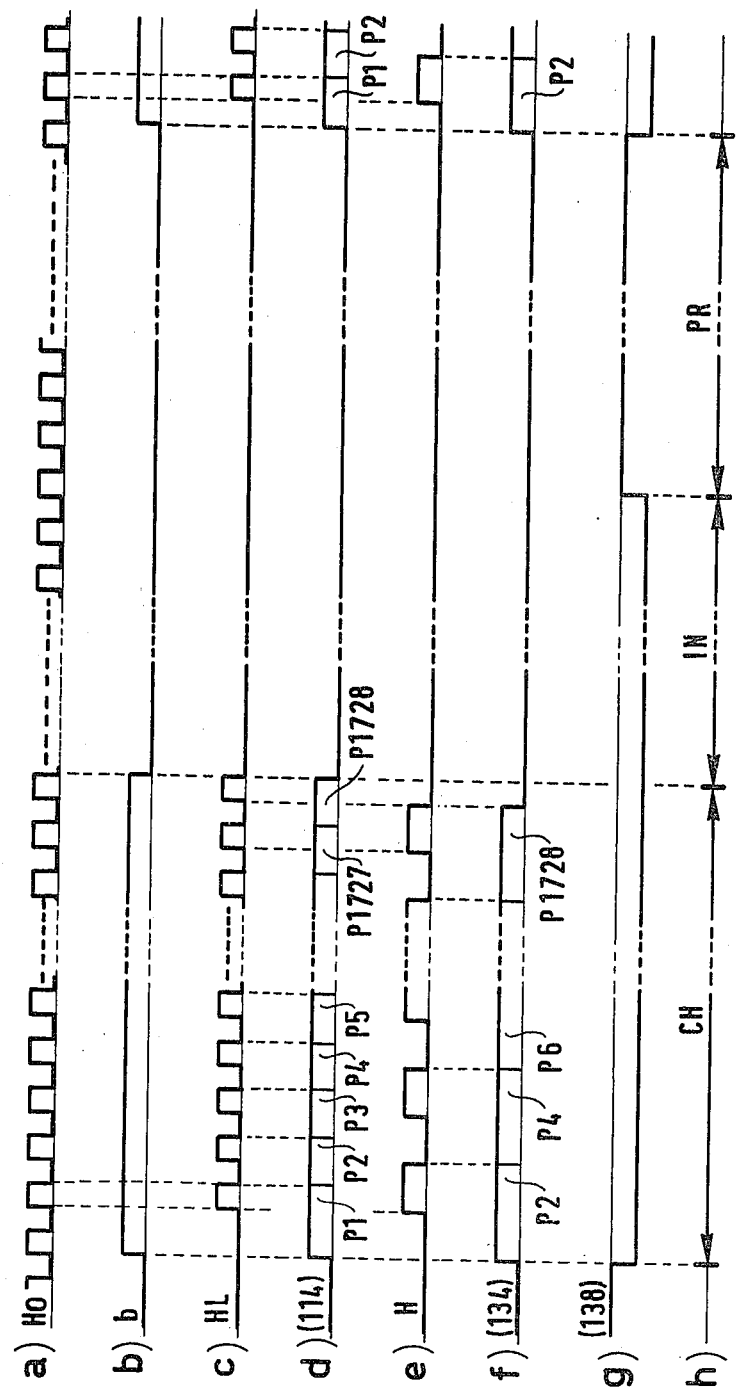
FIG. 12 is a timing diagram relating to the control logic shown in FIG. 11.

FIG. 12 is a timing diagram for the principal control logic signals:

Line (a) shows the output signal $H_O$ of clock 113.

Line (b) shows the output signal of inverter 124, which is the disabling signal for the stylus bar register outputs and is present on output 136.

Line (c) shows signal HL which is output synchronously with signal $H_O$ provided that counter 111 is not at 1728.

Line (d) shows the output signal of switching circuit 107, present at control logic output 114. This is a pulse starting on the rising edge of the output signal from inverter 124 (line b), synchronised on the corresponding falling edges of this signal and signal HL and cut off by signal HL controlling the shift registers during unloading to correspond to points $P_1$ to $P_{1728}$ of each scanning line.

Line (e) shows clock signal H delivered by flip-flop 115 to control logic output 117. Its rising edges sample the signal at output 114 to provide the data DI defining odd points $P_1, P_3, P_5, \ldots P_{1727}$.

Line (f) shows the data signal at output 134, formed from the output signal of switching circuit 107 previously chopped and loaded into register 131 or 132, as appropriate, on the falling edges of signal H. This signal is applied to control logic output 134 to constitute data DP, offset by two scanning lines relative to the signal at output 114, as previously explained.

Line (g) shows the signal at output 138 (output of monostable 137) which resets the stylus bar registers to zero.

Finally, line (h) shows the three consecutive operations of each stylus bar operating phase, conditioned by the operation of the control logic. These operations are denoted CH: load stylus bar registers with outputs disabled; IN: mark points on paper; and PR: execute line feed and reset registers to zero. Note that when the time interval separating the end of transmission of the synchronisation words for two consecutive lines is variable, and may therefore exceed the total duration of these three operations, a "dead" time interval may be present between consecutive operating phases. During this "dead" interval the control logic status is the same as during the paper feed operation.

The control logic shown in FIG. 11 is simplified in the case of shift registers of a stylus bar in accordance with the invention in which the styli are arranged in a single row. In this case, the data DP at input e of the register in question of the stylus bar then comprises, like data DI, the signal at output 114, chopped by the rising edges of the signal on output $\overline{Q}$ (not shown) of flip-flop 115, this signal being applied to the clock input of the register in question.

Figure 13:
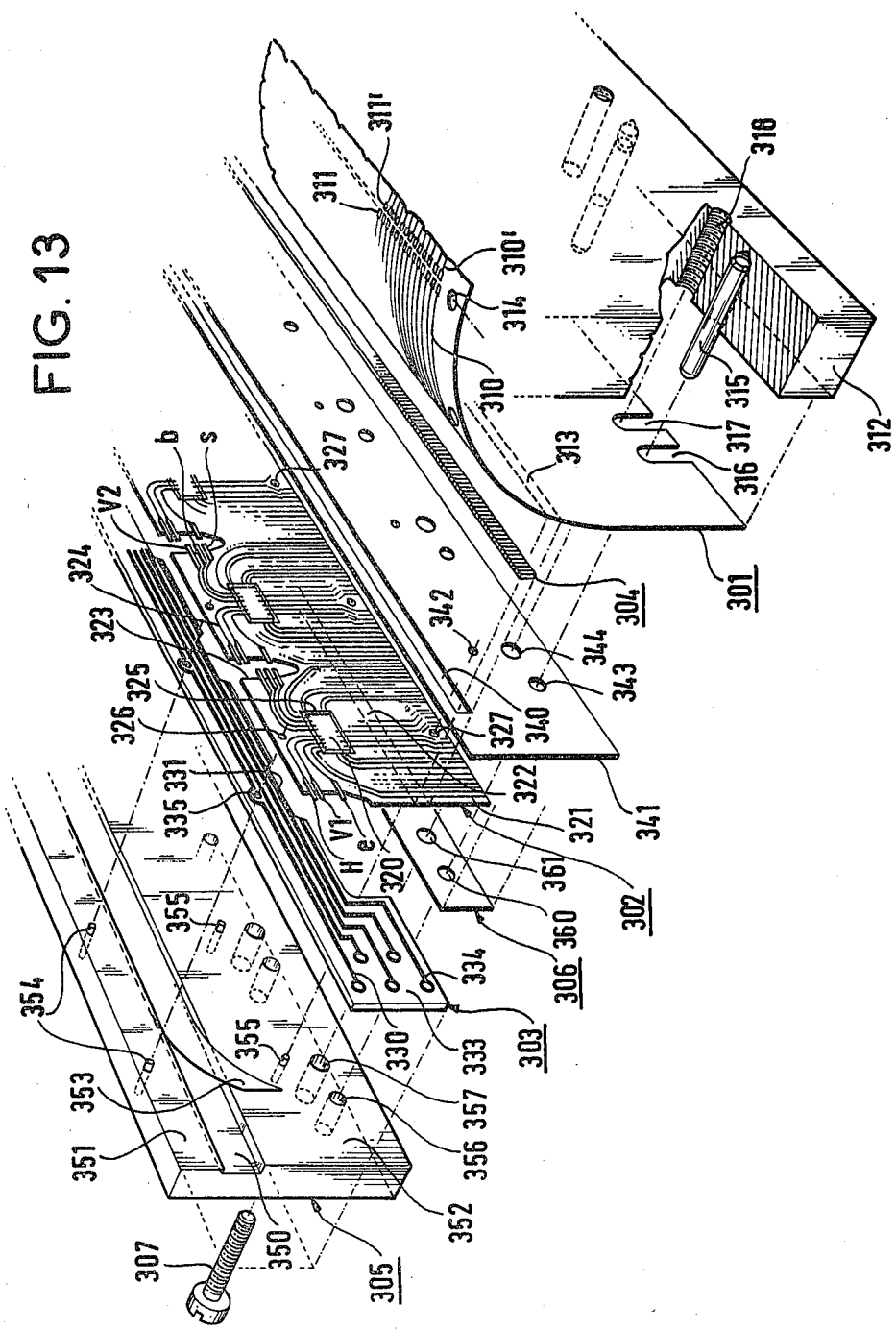
FIG. 13 is an exploded view of half of a stylus bar in accordance with the invention.

FIG. 13 shows one-half of a stylus bar, the other half being similar to that shown. An insulative support 301 carries on one side an array of conductive tracks 310. First ends of these tracks 310 carry respective styli 311, extending along support 301 at regular intervals.

Support 301 is advantageously a film, one side of which is printed to form the tracks 310 and styli 311. The film is mounted on a rigid auxiliary support 312, the non-printed side of the film being in contact with the auxiliary support. The auxiliary support may be of anodised aluminium, for example, having a plate-like or any other suitable shape, with a rounded edge at least in the vicinity of styli 311. This auxiliary support is merely sketched in on FIG. 13, support 301 being turned back to show tracks 310 with respective styli 311. The only part of the other half of the stylus bar shown in the figure is part of a second array of conductive tracks 310', first ends of which carry respective styli 311', on the same side of the support as tracks 310 and styli 311. Styli 311' are regularly spaced at the same pitch as styli 311 and form a row of styli parallel to the row of styli 311. Together, the two rows of styli define a longitudinal stylus area on support 301.

The second ends of tracks 310 and 310' of the two arrays are located on respective opposite sides of the stylus area, adjacent respective longitudinal edges of support 301. In each array, the tracks are parallel to one another.

The two rows of styli 311 and 311' are separated by the width of a scanning line. The styli in one row are opposite the gaps between styli in the other row. In each row, the stylus pitch is twice the separation of image points along each scanning line, each row comprising as many styli as there are image points in a scanning line.

On either side of and adjacent the stylus area are two insulating strips, not shown in FIG. 13 for reasons of clarity. These strips are laid over the conductive tracks 310 and 310' of the respective arrays, to insulate them from the electrosensitive paper as this is scanned by the stylus bar.

That half of the stylus bar shown in the figure includes a film 302 carrying m identical register stage chips 320 extending along the film. Each of the m chips 320 has a serial data input e, a serial data output s, n parallel register outputs (hereinafter parallel outputs), and control inputs comprising two feed inputs $V_1$ and $V_2$, clock input H and an input b disabling the parallel register outputs. The values of m and n are such that the product m.n is at least equal to the number of styli in the respective half of the stylus bar.

The inputs e, $V_1$, $V_2$, H, and b and the serial output s of each chip are marked at the ends of the conductive tracks, rather than on the chip itself, to avoid overcomplicating the drawing in the region of each chip. For the same reason, the parallel register outputs are not referenced in the figure.

The parallel register outputs of the chips are brought out to the same longitudinal edge of film 302, by conductive tracks 321, etc on one side of the film. These tracks 321, etc cross a longitudinal area 322 on this side of the film, in which they are regularly spaced at the pitch of the tracks 310 printed on support 301, in this instance twice the separation of image points along a scanning line. The other longitudinal edge of film 302 is formed with regularly spaced notches 323, etc, each between consecutive chips. Inputs e, $V_1$, $V_2$, H and b and serial output s of each chip are connected by conductive tracks 324, etc to the closest edge of the two adjacent notches. Thus as shown in the figure, inputs H, $V_1$ and e of one chip are brought out to the same nearest edge of one of the two notches adjacent the chip, inputs $V_2$ and b and serial output s of the same chip being brought out to the nearest edge of the other of these two notches. Conductive tracks 324 extend over the edge of the corresponding notches. At each notch, a serial output s is aligned with a serial input e. The other inputs H, $V_1$, $V_2$ and b are arranged on the edges of the notches so as not to be aligned with one another or with serial output s or serial input e. Like inputs of all chips are on the same longitudinal axis, so that there are as many such axes as inputs. Inputs e are aligned with outputs s. This arrangement is such that inputs e, $V_1$ and H of the chip at one end of the film are brought out to the shorter edge of the film, which is formed with a half-notch at this point. Inputs $V_2$ and b and serial output s of the chip at the other end of the film are similarly brought out to the shorter edge of the film, again formed with a half-notch. Thus all the tracks 322 and 324 on the same side of film 302 form m identical arrays, respectively associated with the m chips.

The register stage chips are mounted on film 302 in the Inner Lead Bonding (ILB) phase of the Tape Automated Bonding (TAB) process. They are disposed in respective windows 325 in film 302, projecting beyond these windows on the non-printed side of the film. Each chip is covered with protective varnish (not shown in FIG. 13) deposited on the side which does not project beyond the window, in other words the printed side of the film 302.

That half of the stylus bar shown in the figure further incorporates a terminal strip 303 for interconnecting the chips carried by film 302 so as to constitute a shift register with m.n parallel outputs, and an elastomer connecting strip 304 with conductive areas for connecting at least some of the parallel register outputs of the chips on film 302 to respective tracks 310 on support 301 (the outputs thus connected are referred to as the "useful" outputs).

By way of example, m is equal to 14 and n is equal to 62 for 216 mm long scanning lines each comprising 1728 image points. This means that 864 parallel outputs of the m chips in this half of the stylus bar are "useful", the last four outputs of the last chip of the shift register not being used.

Terminal strip 303 is of an insulating material carrying on one side, facing the non-printed side of film 302, conductive connection tracks 330 disposed in four continuous lines for connecting in parallel inputs H, $V_1$, $V_2$ and b of all chips when terminal strip 303 is applied to film 302. A fifth, discontinuous line connects serial output s of each chip to serial input e of the next chip.

Along one longitudinal edge of terminal strip 303 are cut-outs 331 to accommodate the chips when the terminal strip and film 302 are brought into contact with one another. The fifth line on terminal strip 303 formed by tracks 330 is interrupted by these cutouts 331, so as to correspond to inputs e and outputs s of the chips, brought out to notches 323 in film 302, disposed along a line intersecting the chips.

To offer improved electrical connections between the tracks 330 on terminal strip 303 and the various inputs and the series outputs of the chips, heretofore obtained by pressing terminal strip 303 against film 302, the inputs and serial outputs are soldered to the lines formed by tracks 330 at the notches 323 in film 302.

Terminal strip 303 projects beyond the lateral edge of film 302 by a short distance. Its end portion 333 is widened to carry five connecting terminals 334 at the ends of the five lines formed by tracks 330. These connecting terminals are used for the connections to an external control circuit and constitute the control inputs of the shift register comprising the m chips interconnected by the tracks on terminal strip 303, and the serial data loading input thereof.

The elastomer connecting strip 304 with conductive areas is sandwiched between film 302 and support 301, the printed sides of film 302 and support 301 facing one another. Strip 304 is aligned with area 322 on film 302 and a similar area 313 on support 301, in which tracks 310 are at the same pitch as tracks 321. It connects the useful parallel register outputs of the chips on film 302 to respective tracks 310 on support 301. Connecting strip 304 is disposed in a longitudinal guiding window 340 in an auxiliary film 341 of the same thickness as strip 304, disposed between film 302 (chips) and support 301 (tracks 310 and styli 311). One longitudinal edge of auxiliary film 341 extends along a line between area 322 of film 302 and the row of windows 325 housing chips 320. The other longitudinal edge of auxiliary film 341 projects beyond the longitudinal edge of film 302 to which the chip parallel register outputs are brought out, at approximately the same level as the longitudinal edge of support 301 along which the ends of tracks 310 without styli extend.

Terminal strip 303 and film 302 are mounted on a shift register support 305. This a generally rectangular plate of annodised aluminium, and is formed with a longitudinal groove 350 for receiving chips 320 on film 302. The groove extends along the whole length of support 305 and defines respective longitudinal areas 351 and 352 on either side thereof. The two sides of groove 350 are of different heights, so that areas 351 and 352 are in different planes. That part of support 305 constituting area 351 is less thick than that constituting area 352, so that area 351 is offset to the rear relative to area 352. The separation of the planes of areas 351 and 352 is substantially equal to the thickness of terminal strip 303 plus the thickness of the tracks on the strip, which is placed against area 351 on the support. The non-printed side of strip 303 lies against area 351. The longitudinal edge of strip 303 with cut-outs 331 extends over groove 350, while end portion 333 carrying connecting terminals 334 extends beyond support 305 in the longitudinal direction.

A self-adhesive insulating film 353 is bonded to the base of groove 350 to provide additional electrical insulation, support 305 being coated with an insulating material during manufacture. Silicon grease (not shown)

between film 353 and groove 350 dissipates the heat generated by the chips during operation.

Terminal strip 303 and film 302 are located on support 305 by pins 354, 355, etc inserted in support 305. Pins 354, etc are regularly spaced along support 305 in area 351. The number of pins is equal to the number of chips 320 on film 302. The pins 354, etc extend beyond support 305 on the side with groove 350 and engage respective guiding holes 335, etc and 326, etc in terminal strip 303 and film 302, respectively. The holes 326, etc in film 302 form a longitudinal row adjacent the edge with notches 323, each hole being halfway between adjacent notches. The guide holes 335, etc in terminal strip 303 form a longitudinal row in the vicinity of the edge opposite that with cut-outs 331. The pins 335, etc are regularly spaced along support 305 in area 352. Their number is equal to the number of chips on film 302. The pins 355, etc extend beyond support 305 on the side of groove 350, each in line with a respective pin 354, etc. They engage in respective guide holes 327, etc in film 302. These guide holes 327, etc form a longitudinal row in the vicinity of the edge to which the chip parallel register outputs are brought out, between this edge and area 322.

In this assembly of terminal strip 303 and film 302 on support 305, the non-printed side of the film extending substantially from the row of chips to the edge to which the parallel register outputs are brought out is placed directly against area 352 on support 305, the support and therefore area 352 extending beyond this edge of film 302. In this arrangement, a spacer film 306, the thickness of which is substantially equal to that of film 302 plus that of the tracks on film 302, is arranged as an extension of film 302 on the side of the longitudinal edge to which the parallel register outputs are brought out. Spacing film 306 compensates the difference in level between the longitudinal edges of shift register support 305 and chip film 302 at this point.

Support 305 and pins 355, etc also position connecting strip 304 disposed in the guide window in auxiliary film 341. The ends of pins 355, etc projecting beyond film 302 engage in respective guide holes 342, etc in auxiliary film 341. The guide holes 342, etc are arranged in a longitudinal row, substantially on the median line. Pins 355, etc co-operate with guide holes 327, etc in film 302 and 342, etc in auxiliary film 341 to position connecting strip 304 on area 322 of film 302.

For centering purposes, auxiliary support 312 on which stylus support 301 is mounted is also fitted with pins (not shown in FIG. 13), inserted in auxiliary support 312 adjacent its lateal ends. The ends of the pins project beyond the surface of support 312 which mates with stylus support 301, and engage in respective guide holes 314, etc in support 301. These guide holes are formed adjacent each lateral end of support 301, and are preferably elongate, whereas the corresponding pins are of circular cross-section, so as to provide accurate longitudinal positioning of support 301 on auxiliary support 312 while leaving some lateral play for ease of dismantling.

Also for centering purposes, centring pins 315, etc inserted in auxiliary support 312. These pins are arranged in a longitudinal row along auxiliary support 312. They project towards the components to be centred, passing through a notch 316 in the respective longitudinal edge of stylus support 301, and engage in guide holes 343, 360 and 356 in auxiliary film 341, spacing film 306 and shift register port 305, respectively.

The pins and the associated guiding holes are arranged to correctly position support 305 carrying terminal strip 303, film 303 carrying the chips and extended by spacing film 306, auxiliary film 341 carrying connecting strip 304 and auxiliary support 312 carrying support 301 which in turn carries the stylie and their feed tracks, in order to connect the useful parallel register outputs of chips 320 to respective feed tracks 310 of the styli 311.

The correctly assembled components are attached together by means of screws 307, etc. These screws 307, etc are aligned with pins 315, etc, passing through holes 357, 361 and 344 in shift register support 305, spacing film 306 and auxiliary film 304, respectively. They also pass through a notch 317 in the longitudinal edge of film 301 carrying styli 311 and their feed tracks, screwing into a threaded hole 318 in auxiliary support 312.

Support 301 carrying styli 311 and their feed tracks is formed with notches 316 and 317 rather than guide holes so that it may be disengaged from pins 315 and screws 307 without completely dismantling the assembly. Note also that in this assembly auxiliary film 341 carrying connection strip 304 and spacing film 306 prevents connection strip 304 being crushed when screws 307 are tightened down.

Figure 14:
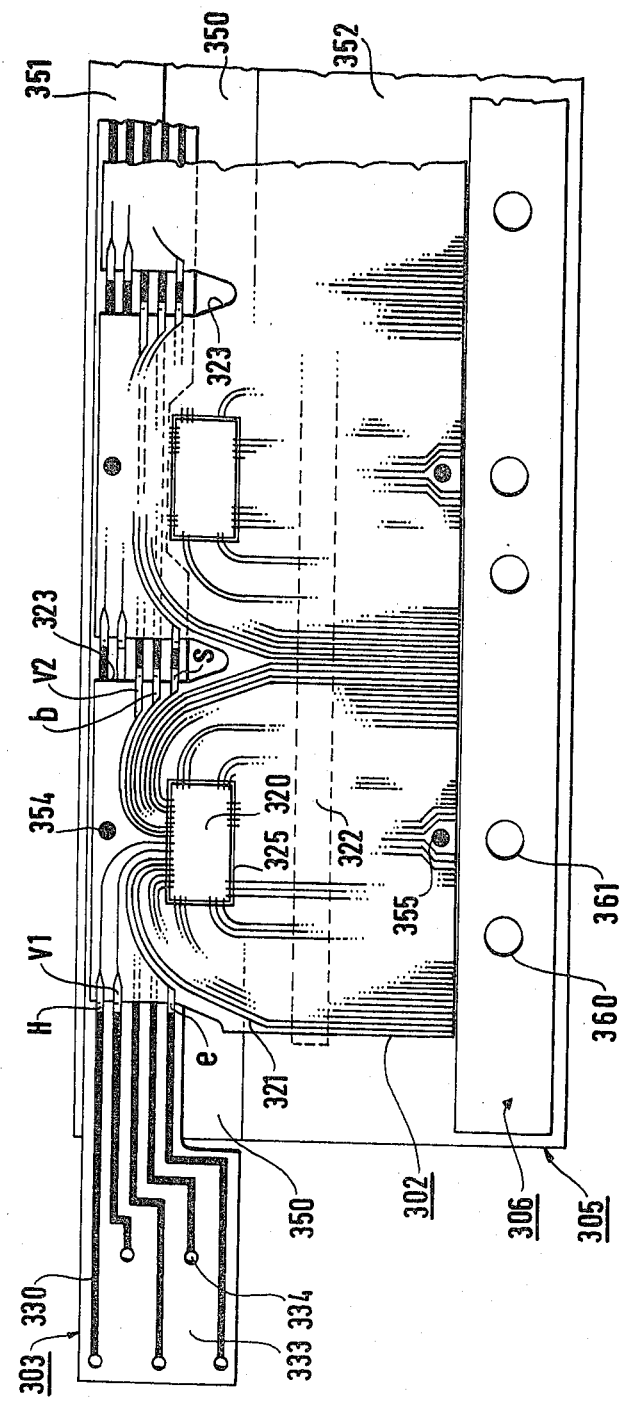
FIG. 14 shows components of the stylus bar shown in FIG. 13 constituting one of the shift registers thereof.

FIG. 14 shows the shift register obtained by associating film 302 carrying the chips and terminal strip 303, both components mounted on shift register support 305 as previously described with reference to FIG. 13.

Components in FIG. 14 already mentioned in the description with respect to FIG. 13 are similarly referenced and will not be described again. FIG. 14 clearly shows the connections across notches 323 in film 302 between the tracks on terminal strip 303, running along the non-printed side of film 302, and the chip inputs and outputs brought out to the edges of these notches. Also shown is spacing film 306 extending film 302 on the longitudinal edge to which the parallel register outputs are brought out, providing passage for centring pins and retaining screws in holes 360 and 361 without damage to or requiring any special arrangement of the tracks on film 302.

Figure 15:
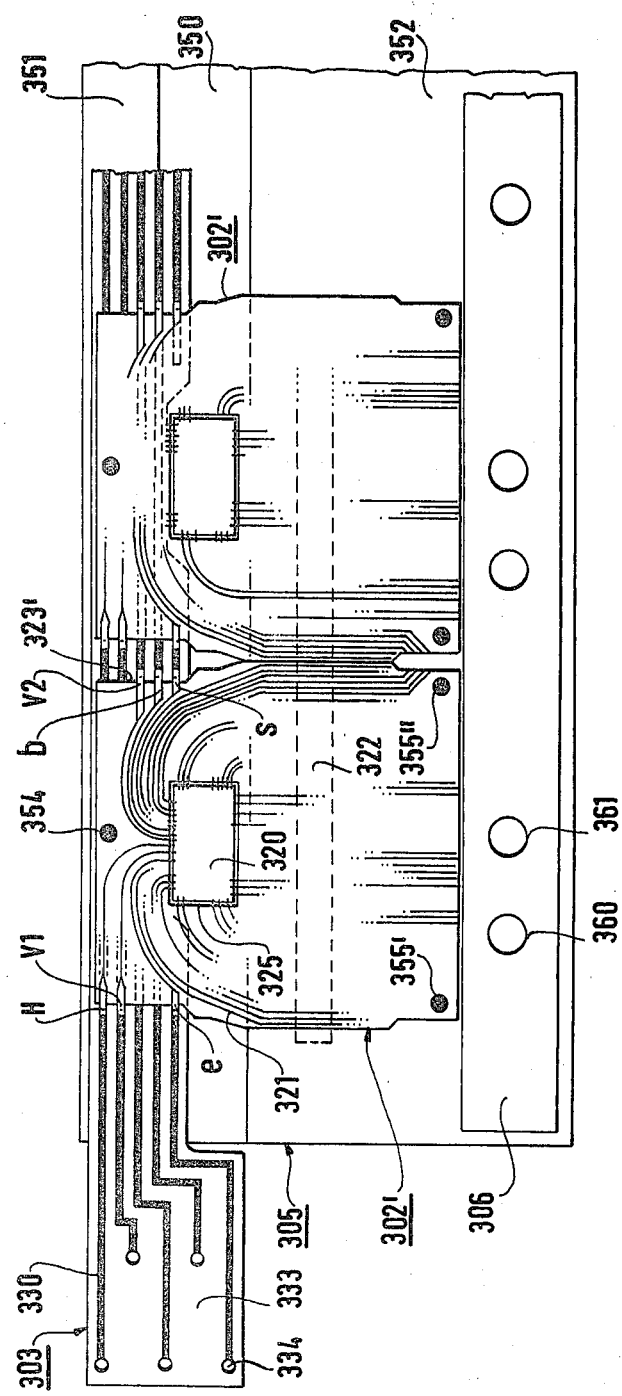
FIG. 15 shows a modification to the stylus bar shown in FIG. 14.

FIG. 15 shows a modified form of shift register as compared with the embodiment shown in FIG. 14 and thus in FIG. 13. This embodiment comprises components identical to those of FIGS. 13 and 14, namely the shift register support, the terminal strip and the spacing film. These components and the various parts thereof are referenced using the same numerals as in previous figures. The shift register differs from those shown in FIGS. 13 and 14 principally in that the chip carrier film 302 is obtained by associating m separate films 302', each carrying one register stage chip 320 and tracks 321 connected to the chip inputs and outputs. These tracks 321 form on one side of each separate film 302' an array substantially similar to those formed repetitively on the single chip film in FIGS. 13 and 14.

Each of these separate films 302' has a cutaway on each of two opposite sides forming a respective half-notch. The inputs and serial output of the chip on each separate film are brought out to the edges of one of these half-notches. Each separate film is formed with a guide hole adjacent its edge and between the two half-notches, engaging a pin 354 in support 305, identical to pin 354 in FIGS. 13 and 14. Each separate film has two further guide holes adjacent the edge to which the parallel register outputs are brought out and also adjacent one of the aforementioned opposite side edges. These guide holes receive pins 355' and 355" carried by support 305. Pins 354, 355′ and 355″ and the corresponding guide holes in the respective separate films ensure correct positioning of the separate films 302′ relative to one another and on support 305, so that the overall assembly is technically equivalent to a single film.

The advantage of this arrangement is concerned with mass-production. The chips for the stylus bars are mounted on a single film using the Inner Lead Bonding (ILB) phase of the Tape Automated Bonding (TAB) process. The tracks associated with the chips are previously formed on this single film, extended by test points. The chips are then tested individually, faulty chips being marked. The single film is then divided to form the separate films, each carrying one chip and the associated tracks. The separate films carrying chips marked as faulty are discarded. Thus a faulty chip leads to the discarding only of that chip and the separate film on which it is mounted, whereas in a embodiment as shown in FIGS. 13 and 14, a chip found to be faulty after mounting on the single film results in the discarding of all m chips on the film.

Furthermore, the arrangement using separate films means that any chip may be subsequently replaced independently of the others.

Figure 16:
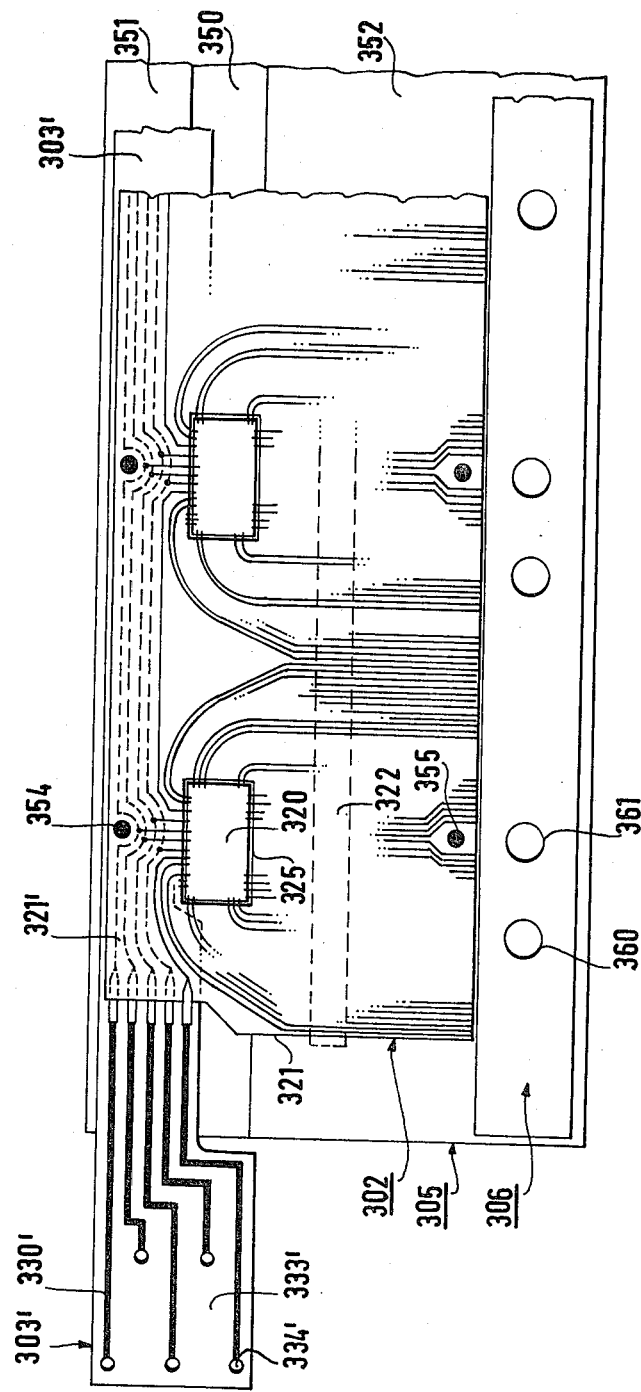
FIG. 16 shows another modification to the stylus bar shown in FIG. 14.

FIG. 16 shows a further embodiment of a shift register constituted by m chips. This differs from preceding embodiments primarily with regard to the chip connections.

Aspects of the embodiment shown in FIG. 16 already described with reference to FIG. 14 will not be described again. The single film 302 on which chips 320 are mounted is printed on both sides. Tracks 321 providing the parallel register outputs and the tracks connecting serial output s of each chip to input e of the next chip are printed on one side, while four connecting tracks 321′ are printed on the other side, adjacent the longitudinal edge opposite the longitudinal edge to which the parallel register outputs are brought out, the former longitudinal edge not being chamfered in this embodiment.

Tracks 321′ are continuous and directed around the guide holes in the film adjacent respective chips, receiving pins 354. These tracks are brought out to at least one lateral edge of the film. Control inputs $V_1$, H, $V_2$ and b of each chip are slightly offset relative to the chip by means of very short tracks printed on the side carrying tracks 321. They are connected by means of plated through-holes to respective tracks 321′, which thus connect in parallel like control inputs of the m chips. The connection method using plated through-holes is known per se.

A terminal strip 303′ similar in size and shape to terminal strip 303 of FIG. 14 is applied against the side of the film carrying track 321′. The portion of terminal strip 303′ extending beyond film 302 carries five tracks 330′, etc printed on the side against film 302 and extending across a widened end portion 333′ to connecting terminals 334′, to which an external control and data input circuit is connected.

Tracks 330′ are soldered to respective tracks 321′ brought out to this lateral edge of the film, and to input e of the adjacent chip, also brought out to this lateral edge by a track printed on the side carrying tracks 321.

This arrangement minimises the number of connections to be made between tracks on the terminal strip and tracks on the film, the latter providing the parallel connections between like control inputs of the chips and the serial interconnection of the chips.

Figure 17:
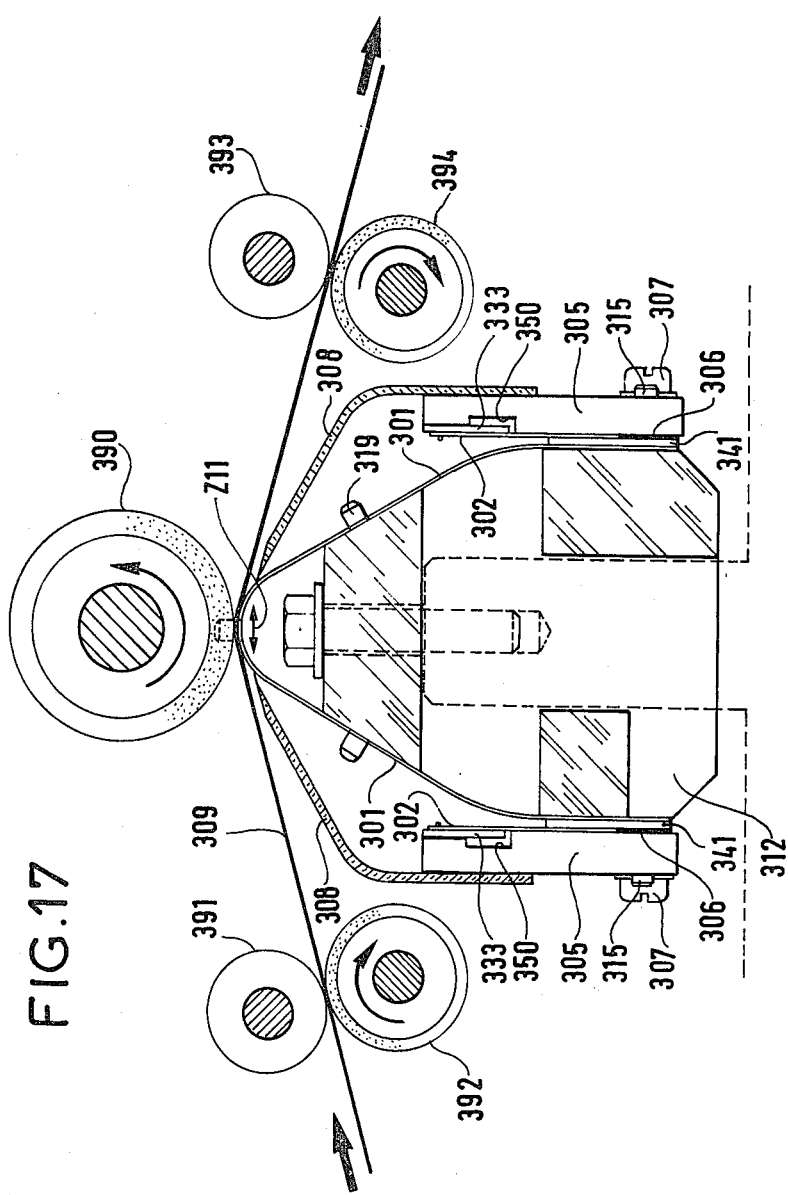
FIG. 17 is an end view of the stylus bar shown in FIG. 13.

FIG. 17 is an end view showing a complete stylus bar and the associated printing paper, the stylus bar being of rounded shape in the stylus area, also known as the printing area. This figure shows, for each half of the stylus bar described with reference to FIG. 13, stylus support 301 with the associated feed tracks and stylus area Z11, and auxillary support 312 on which is mounted support or film 301. This support defines the general shape of the stylus bar. As it is hollow in this embodiment, auxillary components (not shown) are used at its ends for attachment purposes, in particular to attach the external control circuit. Mounted on the outside of support 301 are shift register supports 305, one on each side of support 301. Between each support 305 and film 301 is the terminal strip, end portion 333 of which is visible in this figure, chip film 302 extended by spacing film 306 and support 341 for the connecting strip providing the connections between the useful parallel register outputs and the stylus feed tracks. The assembled components are held together by screws 307. A dust cover is formed by two folded plates 308 mounted on respective supports 305 and extending to the vicinity of the stylus area Z11.

The paper 309 passes between pairs of rollers 391, 392 and 393, 394 on opposite sides of the stylus bar. It is moved across stylus area Z11 by the driven rollers (392 and 394). An auxillary roller 390 operates in conjunction with the aforementioned rollers to maintain the paper in contact with stylus area Z11.

Figure 18:
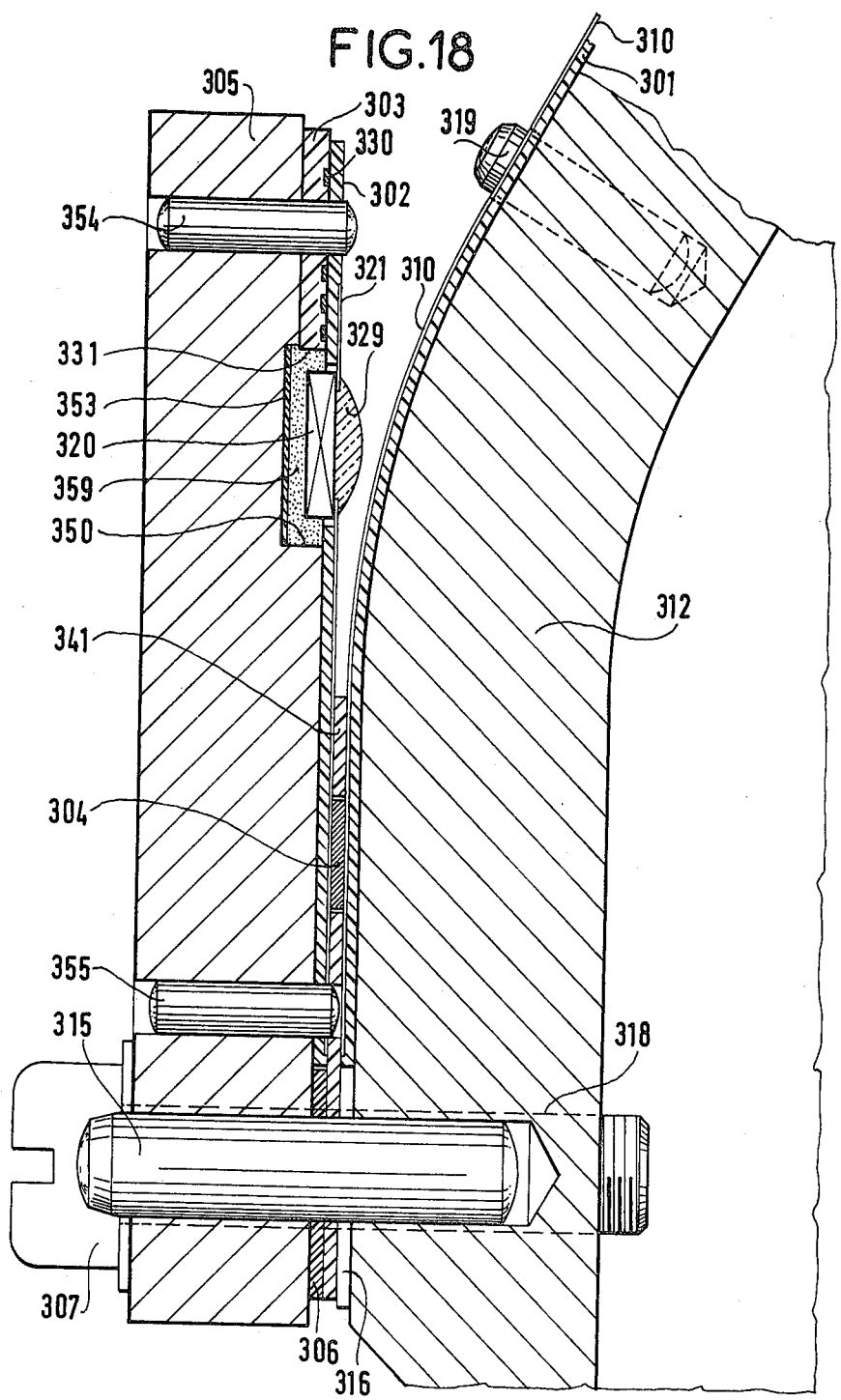
FIG. 18 is a cross-section through the half-stylus bar shown in FIG. 13, in the embodiment shown in FIG. 17.

FIG. 18 is a partial transverse cross-section through the half stylus-bar shown in FIG. 13, in the embodiment shown in FIG. 17. The cross-section plane passes through a chip. FIG. 18 shows support 305 on which terminal strip 303 is centred by pins 354 and 355 (in this view terminal strip 303 is sectioned in one of the cut-outs 331). FIG. 18 also shows film 302 with one of the chips 320 which it carries housed in groove 350 on support 305, and spacing film 306 extending film 302 to the level of support 305. Support 301 carrying styli feed tracks 310 is positioned on auxiliary support 312 by pins 319. Connecting strip 304 is disposed in the window in auxiliary film 341. The assembly is aligned by pins 315 and held together by screws 307 engaging threaded holes 318.

Insulating film 353 is bonded to the base of groove 350 in support 305. Silicone grease 359 dissipates heat generated by the chip. Protective varnish 329 covers the side of each chip 320 opposite that inside groove 350 on support 305.

To show up the various tracks printed on terminal strip 303, film 302 and support 301, they are shown as if recessed into these components. In reality, they are printed directly onto the surfaces thereof.

The figures, especially FIG. 13, show only selected components of the complete stylus bar. The latter in fact comprises, associated with the array of feed tracks 310′ for styli 311′, an arrangement similar to that associated with tracks 310 and styli 311. In other words, and as shown in FIG. 17, involving a second shift register mounted on a second support with its useful parallel register outputs connected to tracks 310′ by another connecting strip. In a complete stylus bar assembly, the two films 302 carrying the register stage chips are preferably equipped identically, rather than symmetrically. Thus the sides of the two films 302 carrying the tracks to connect to those of support 301 (facing one another and identically oriented in the stylus bar assembly as shown in FIG. 17, or facing the same side in a flat stylus bar in which films 302 are mounted head-to-tail), the first chip of one shift register faces the final chip of the other shift register, with an offset equal to the pitch of the image points on a scanning line. This implies that the serial input of one shift register receives data defining image points of one parity along a scanning line in increasing order, while the other receives data defining the image points of the opposite parity on a scanning line in decreasing order. To this end, the external control circuit for the stylus bar, hereinbefore referred to as the control logic and one specific embodiment of which is shown in FIG. 11, is implemented using buffer memories comprising, instead of a shift register as in the previously described embodiment, a random access memory activated alternately in load (write) and unload (read) mode, operating in conjunction with a counter (or up-/down counter) appropriately initialised and used to read previously written data in the required order.

Note that during operation of the stylus bar as shown in FIG. 13 and subsequent figures, the absence of a reset control input to the register stage chips means that the parallel register outputs of these chips are disabled not only during loading of the two shift registers formed by the chips, but also while advancing the paper one line feed relative to the stylus bar. The disabling signal may be readily derived from the control circuit shown in FIG. 11, (for example: at the output of a monostable connected through inverter 124 to the output of counter 111, which counts the data unloaded from whichever input buffer memory is currently being unloaded, the capacity of this counter being 1728 with 1728 image points per scanning line). In this case, each falling edge of the output signal of inverter 124 would produce a zero level at the output of this monstable for a predetermined time interval during which the image points would be printed on the paper.

The stylus bar in accordance with the invention has been described with reference to the accompanying drawings. It will be apparent that these drawings are given by way of example only, and that modifications of detail may be made thereto without departing from the scope of the invention.

What is claimed:

1. A stylus bar for two-state printing on electrosensitive paper scanned in successive lines by said bar which comprises as many mutually insulated styli forming a stylus area on said bar as there are image points in each scanning line and a shift register type memory receiving data defining said image points, with a shift control input and supply inputs and with parallel outputs individually controlling said styli and thereby the marking of said image points on said paper, the stylus bar being characterized in that said memory comprises 2.m register stage chips each with a serial data input, n parallel outputs, a serial data output and control inputs comprising a clock input controlling the shifting of data from one register stage to the next and two feed inputs defining two voltage levels corresponding to the levels of said data, m and n being integers such that the product 2.m.n. is at least equal to the number of styli, said chips being supported on at least one film and connected in series in two groups of m chips with their control inputs of the same type placed in parallel, with its m chips arranged basically in a same plane and each with an input series of data and constituting two separate shift registers each with m.n parallel outputs, at least some of which consecutive parallel outputs of said m chips in series and forming useful parallel outputs of the m chips of the register in question being connected to respective styli of like rank in said stylus area, so that respective regsiters are connected to odd ranked styli and to even ranked styli in the stylus area, so as to simultaneously feed said styli with one of said voltage levels, according to the binary data level present on respective useful parallel outputs of said chips, representing individual control signals for the styli to which they are connected.

2. A stylus bar according to claim 1, characterised in that at least one film is disposed on a support to define similar parts carrying respective arrays of conductive tracks, the first ends of which carry respective styli and are regularly spaced in each array along the stylus area thus formed, each film carrying m register stage chips connected in series and defining a control area, the second ends of the tracks of the respective array in each part being arranged in m sets terminating at the perimeters of respective chips, to respective useful parallel outputs of which they are connected.

3. A stylus bar according to claim 1, characterised in that it comprises two films each carrying m register stage chips connected in series and disposed adjacent one longitudinal edge of the film, each film further carrying an array of conductive tracks the first ends of which are regularly spaced along and project beyond the other longitudinal edge of the film, and each carry a respective stylus, the second ends of said tracks being arranged in m sets terminating at the perimeters of the m chips, to respective useful parallel outputs of which they are connected, the stylus bar further comprising a support on which said films are mounted, substantially superposed on one another, the styli carried by the films forming said stylus area.

4. A stylus bar according to claim 1, characterised in that it comprises two films each carrying m register stage chips connected in series, respective useful parallel outputs thereof being brought out to and regularly spaced along a longitudinal edge of the film, and an insulative support carrying two arrays of conductive tracks, the first ends of which carry respective styli and extend, regularly spaced within each array, into a longitudinal area of the support constituting said stylus area, second ends of the tracks of the two arrays, also regularly spaced in each array, extending into two other longitudinal areas of the support, one on each side of said stylus area, each array being connected to respective useful parallel outputs of the chips of the respective film, on each of which the useful parallel outputs of the chips are regularly spaced at the same pitch as the second ends of the tracks of the respective array.

5. A stylus bar according to claim 4, characterised in that it further comprises two elastomer connecting strips with conductive areas, sandwiched between the support and the respective film, in line with said second ends of said tracks and said useful parallel outputs of said chips, providing respective interconnections therebetween.

6. A stylus bar according to any one of claims 2, 4 and 5, characterised in that said styli are arranged in two rows in said stylus area, separated by a distance equal to the height of a scanning line, the styli of one row, at the first ends of the tracks of one array, being aligned with the gaps between styli of the other row, at the first ends of the tracks of the other array.

7. A stylus bar according to any one of claims 2, 4 and 5, characterised in that said support is flexible and is mounted on a rigid auxiliary support, part of the external surface of which is rounded and supports the stylus area defined on said flexible support.

8. A stylus bar according to claim 6 or claim 7, characterised in that it comprises two insulating strips disposed along the stylus area to cover respective portions of the tracks of respective arrays adjacent said stylus area.

9. A stylus bar according to claim 5, characterised in that it comprises a terminal strip associated with each film carrying m chips, having a terminal end portion projecting beyond said film, mating surfaces of the terminal strip and the film carrying conductive connecting tracks, the number of such tracks being at least equal to the number of control inputs of each of the m chips, said connecting tracks providing the parallel connection of like control inputs of the m chips, the aforementioned terminal end portion of the terminal strip also carrying portions of conductive tracks providing external connections to the inputs of the associated shift register, the stylus bar further comprising a shift register support on which the film and the terminal strip are mounted in a sandwich structure with the terminal strip in the middle, the shift register support having on one surface a longitudinal groove receiving the chips projecting beyond the juxtaposed face of the film, the edges of said groove being at different levels to define, on respective sides of the groove, two areas of which one is offset relative to the other by a distance substantially equal to the thickness of the terminal strip, said one area having a width substantially equal to that of the terminal strip, so as to constitute a recess for accommodating the terminal strip.

10. A stylus bar according to claim 9, in which each terminal strip is printed along its length and carries the connecting tracks and track portions on its surface in contact with the associated film, characterised in that each of the two films carrying m chips is notched along its longitudinal edge opposite that to which the parallel outputs of the chips are brought out, the notches being situated between consecutive chips, the side opposite that in contact with the associated terminal strip carrying, in addition to conductive tracks from the aforementioned parallel outputs to the respective longitudinal edge, further tracks connecting the serial input, serial output and control inputs of each chip to respective edges of two notches adjacent to the chip in question, for their respective electrical connections to the tracks on the associated terminal strip.

11. A stylus bar according to claim 9 or claim 10, characterised in that the longitudinal groove in each shift register support contains silicone grease to dissipate heat generated by the chips therein.

12. A stylus bar according to claim 9, characterised in that each shift register support projects beyond that edge of the film carrying m chips which it supports to which the parallel outputs of the chips are brought out, a spacing film being associated with each film carrying m chips to extend the latter for mounting the support corresponding to the shift register on the support carrying the two arrays of tracks and their respective styli, and attaching it thereto.

13. A stylus bar according to claim 9, characterised in that said two elastomer connecting strips with conductive areas are disposed in respective longitudinal windows in respective auxiliary films of substantially the same thickness as the strips, sandwiched between the respective film carrying m chips and the support, aligned with the parallel outputs of the chips of the respective arrays of paths.

14. A stylus bar according to claim 10, characterised in that each of the two films carrying m chips comprises m separate films each carrying a single chip, mounted side by side with the associated terminal strip in sandwich configuration on the corresponding shift register support.

15. A device for printing a two-state image on electrosensitive paper scanned in successive lines by said device, according to binary data D relative to each successive scanning line and received by the device at a rate defined by a clock signal HR, a short "line change" pulse being applied to the device on each change of scanning line to which said data D relates, said device incorporating a stylus bar according to claim 6 and being characterised in that it comprises control logic associated with the stylus bar, each of the register stage chips in the stylus bar and thus each of the shift registers formed thereby including a control input disabling its parallel outputs, said control logic comprising two first buffer memories, the capacity of each being equal to the number of points per scanning line, alternately loaded with the data D received by the device under the control of clock signal HR and unloaded to a first output of the control logic, under the control of a clock signal HL and at a rate set by said "line change" pulses, means for generating said clock signal HL comprising a clock generating signal $H_0$ associated with a counter receiving on its input said signal HL and disabling signal $H_0$ when the counter state is equal to the number of points per line, said counter being reset to 0 by each line change pulse to enable said signal $H_0$ which then constitutes said signal HL, the control logic further comprising two second buffer memories, the capacity of each being equal to the number of points per scanning line, alternately loaded with the data output to said first output of the control logic under the control of a signal H at one-half the rate of signal HL and alternately unloaded to a second output of the control logic under the control of said signal H, unloading being effected every other line change pulse, said first and second outputs of said control logic being connected to respective serial inputs of respective shift registers of the stylus bar to load said registers under the control of said signal H applied to the shift control inputs of the registers, said counter providing a disabling signal applied to the parallel output disabling input of each register of the stylus bar to disable said parallel outputs when the counter state is not equal to the number of points per scanning line.

16. A device according to claim 15, characterised in that said means for generating said clock signal HL comprise, in addition to said clock generating signal $H_0$ and said associated counter, a circuit disabling said signal $H_0$ comprising a first AND gate receiving said signal $H_0$ and activated by said counter when the state thereof is not equal to the number of points per scanning line, and a flip-flop with its control input connected to the output of said first AND gate so as to provide logic "1" at its output on each falling edge of the output signal of said first AND gate, a second AND gate connected both to the input and to the output of said flip-flop and providing said signal HL at its output.

17. A method of manufacturing a stylus bar as claimed in claim 2, characterised in that it comprises the steps of defining on a single film at least twice as long as the stylus bar respective locations for said 2.m chips, adjacent one longitudinal edge of the film; forming two juxtaposed arrays of conductive tracks on the film, constituting a total of 2.m sets of tracks in both arrays extending away from the chip locations to the other longitudinal edge of the film, along which they are regularly spaced to constitute said first ends; electrolytically depositing on each of said first path ends a conductive material resistant to abrasion to form the styli; mounting said chips on said film in their respective locations using the Inner Lead Bonding (ILB) phase of the Tape Automated Bonding (TAB) process so as to connect said useful parallel outputs of the chips to the tracks of the respective arrays and to serially connect the chips to constitute the two shift registers, juxtaposed on the film; and dividing said film to constitute said two similar parts mounted on said support.

18. A method of manufacturing a stylus bar as claimed in claim 2, characterised in that it comprises the steps of defining on one film locations for said 2.m register stage chips adjacent respective longitudinal edges of the film; forming on the film two arrays of conductive tracks, substantially symmetrical relative to the median longitudinal axis of the film, so as to form m sets in each array extending away from respective chip locations to the vicinity of said median axis of the film, along which they are regularly spaced and constitute said first track ends; electrolytically depositing on each of said first ends of the tracks a conductive material resistant to abrasion to form the styli; mounting said chips on said film at their respective locations using the Inner Lead Bonding (ILB) phase of the Tape Automated Bonding (TAB) process; connecting said useful parallel outputs of the chips to the tracks of the respective sets and connecting the chips in series to constitute the two shift registers; and mounting the film on said support.

19. A method of manufacturing a stylus bar as claimed in claim 3, characterised in that it comprises the steps of forming on one film at least twice as long as the stylus bars respective locations for said 2.m chips, adjacent one longitudinal edge of the film; forming on said film two juxtaposed arrays of conductive tracks forming a total of 2.m sets for both arrays extending away from respective chip locations to the other longitudinal edge of said film, beyond which they project to constitute said first track ends and along which they are regularly spaced; electrolytically depositing on each of said first track ends a conductive material resistant to abrasion to form the styli; mounting said chips on said film at their respective locations using the Inner Lead Bonding (ILB) phase of the Tape Automated Bonding (TAB) process; connecting said useful parallel outputs of the chips to the tracks of respective sets and connecting the chips in series to constitute the two shift registers juxtaposed on the film; and dividing the film to constitute said two films mounted substantially superposed on said support assembly.

20. A method of manufacturing a stylus bar as claimed in claim 4, characterised in that it comprises the steps of forming on said support the two arrays of conductive tracks extending, in each array, from a first longitudinal area on the support in which they are regularly spaced in each array and constitute said first ends, into respective second longitudinal areas on opposite sides of said first area, in which they are regularly spaced in each array and constitute said second ends; electrolytically depositing on each of the first track ends a conductive material which is resistant to abrasion to form the styli; mounting m register stage chips at predetermined locations on each of said films, using the Inner Lead Bonding (ILB) phase of the Tape Automated Bonding (TAB) process; bringing the useful parallel outputs of the chips out to the same edge at a regular pitch equal to that of said second track ends and connecting the m chips on each film in series; electrolytically depositing a conductive material on each of said second track ends and on each of the regularly spaced useful parallel outputs of the chips to form respective contact tabs; and bringing into and maintaining in contact the tabs on said second track ends of the two arrays and the tabs formed on the useful parallel outputs of the chips on the two films, to connect each track to a respective output.

21. A method of manufacturing a stylus bar as claimed in claim 5, characterised in that it comprises the steps of forming on said support two arrays of conductive tracks extending, in each array, from a first longitudinal area on the support in which they are regularly spaced in each array and constitute said first track ends, to respective second longitudinal areas on the support on opposite sides of said first area, in which they are regularly spaced in each array and constitute said second track ends; electrolytically depositing on each of the said first track ends a conductive material resistant to abrasion to form the styli; mounting said register stage chips on each film in predefined locations using the Inner Lead Bonding (ILB) phase of the Tape Automated Bonding (TAB) process; bringing the useful parallel outputs of the chips out to one edge at a regular pitch equal to that of the second track ends of one array, and connecting the m chips on each film in series; and mounting and maintaining the two connecting strips between the support and the respective film, aligned with the second track ends and the useful parallel outputs of the chips, to form the respective connections therebetween.

* * * * *